United States Patent
Hiramatsu et al.

(10) Patent No.: US 8,181,729 B2
(45) Date of Patent: May 22, 2012

(54) MOTORCYCLE

(75) Inventors: Kinuo Hiramatsu, Saitama (JP); Yoshiyuki Kurayoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 737 days.

(21) Appl. No.: 12/340,799

(22) Filed: Dec. 22, 2008

(65) Prior Publication Data

US 2009/0166121 A1 Jul. 2, 2009

(30) Foreign Application Priority Data

Dec. 30, 2007 (JP) ................................ 2007-341577
Dec. 30, 2007 (JP) ................................ 2007-341578

(51) Int. Cl.
*B60K 13/02* (2006.01)
(52) U.S. Cl. ..................................... 180/68.3; 180/68.1
(58) Field of Classification Search .............. 180/68.1, 180/68.2, 68.3, 68.4, 225, 229
See application file for complete search history.

(56) References Cited

U.S. PATENT DOCUMENTS

| | | | | |
|---|---|---|---|---|
| 4,709,774 A * | 12/1987 | Saito et al. | ..................... | 180/229 |
| 4,793,293 A * | 12/1988 | Minami | ..................... | 123/41.7 |
| 5,012,883 A * | 5/1991 | Hiramatsu | ..................... | 180/225 |
| 5,301,767 A * | 4/1994 | Shiohara | ..................... | 180/219 |
| 5,490,573 A * | 2/1996 | Hagiwara et al. | ..................... | 180/68.1 |
| 5,577,570 A * | 11/1996 | Shiohara et al. | ..................... | 180/219 |
| 6,287,354 B1 * | 9/2001 | Nozaki | ..................... | 55/385.3 |
| 6,409,783 B1 * | 6/2002 | Miyajima et al. | ..................... | 55/385.3 |
| 7,314,107 B2 * | 1/2008 | Nakagome et al. | ..................... | 180/68.3 |
| 7,318,497 B2 * | 1/2008 | Okunosono | ..................... | 181/227 |
| 7,357,205 B2 * | 4/2008 | Nishizawa | ..................... | 180/68.3 |
| 7,361,201 B2 * | 4/2008 | Nakagome et al. | ..................... | 55/385.3 |
| 7,380,624 B2 * | 6/2008 | Momosaki | ..................... | 180/68.3 |
| 7,404,463 B2 * | 7/2008 | Saiki et al. | ..................... | 180/68.4 |
| 7,410,025 B2 * | 8/2008 | Sunaguchi et al. | ..................... | 180/229 |
| 7,681,678 B2 * | 3/2010 | Shiraishi | ..................... | 180/68.3 |
| 7,712,564 B2 * | 5/2010 | Schmidt et al. | ..................... | 180/219 |
| 7,743,868 B2 * | 6/2010 | Buell | ..................... | 180/229 |
| 7,779,950 B2 * | 8/2010 | Hoeve et al. | ..................... | 180/219 |
| 7,806,212 B2 * | 10/2010 | Sudoh et al. | ..................... | 180/68.3 |
| 7,942,226 B2 * | 5/2011 | Nishizawa et al. | ..................... | 180/219 |
| 7,963,354 B2 * | 6/2011 | Miyakawa et al. | ..................... | 180/68.3 |
| 7,963,358 B2 * | 6/2011 | Buell et al. | ..................... | 180/225 |

(Continued)

FOREIGN PATENT DOCUMENTS

EP 0210545 A2 2/1987

(Continued)

*Primary Examiner* — Jeffrey J Restifo
(74) *Attorney, Agent, or Firm* — Birch, Stewart, Kolasch & Birch, LLP

(57) ABSTRACT

To concentrate mass, to lower the center of gravity, to efficiently and optimally arrange an intake part for making a compact vehicle body. A cylinder inclined to the rear is arranged under a fuel tank and a body of an intake box is housed between a radiator arranged in front of the cylinder and the cylinder. An upper part of the body of the intake box is fixed to a body frame at the bottom of the fuel tank and air taken in is supplied to an intake port through an intake funnel and a throttle body respectively built-in. A lid of an intake duct can be extractably inserted into a window hole provided to the front of the body, a duct part integrated with the lid is arranged over the radiator, and an air intake guide port takes a flow of air in front of the radiator.

16 Claims, 21 Drawing Sheets

U.S. PATENT DOCUMENTS

| | | | |
|---|---|---|---|
| 7,967,092 B2* | 6/2011 | Fujimura | 180/68.3 |
| 7,987,938 B2* | 8/2011 | Morita et al. | 180/68.4 |
| 8,006,791 B2* | 8/2011 | Nakagome et al. | 180/68.1 |
| 8,006,792 B2* | 8/2011 | Nakao et al. | 180/68.1 |
| 2009/0008181 A1* | 1/2009 | Pedersen et al. | 180/229 |
| 2009/0166121 A1* | 7/2009 | Hiramatsu et al. | 180/291 |
| 2009/0218152 A1* | 9/2009 | Oohashi et al. | 180/68.3 |
| 2009/0242297 A1* | 10/2009 | Asano | 180/68.4 |
| 2010/0096201 A1* | 4/2010 | Nagao et al. | 180/68.3 |

FOREIGN PATENT DOCUMENTS

| | | |
|---|---|---|
| JP | 62-26288 U | 2/1987 |
| JP | 3-79825 U | 8/1991 |
| JP | 2722097 B2 | 11/1997 |
| JP | 2004-174461 A | 6/2004 |
| JP | 2005-83279 A | 3/2005 |
| JP | 2005-171864 A | 6/2005 |
| JP | 2005-529030 A | 9/2005 |
| JP | 3962012 B2 | 5/2007 |

* cited by examiner

MOTORCYCLE

CROSS-REFERENCE TO RELATED APPLICATIONS

The present application claims priority under 35 USC 119 to Japanese Patent Application No. 2007-341577 and Japanese Patent Application No. 2007-341578 both filed on Nov. 30, 2007 the entire contents of which are hereby incorporated by reference.

BACKGROUND OF THE INVENTION

1. Field of the Invention

The present invention relates to a motorcycle, particularly relates to a motorcycle provided with an intake part that can concentrate mass, can lower the center of gravity and can make the motorcycle compact.

According to an embodiment of the invention, a vertical direction, a longitudinal direction and a lateral direction are based upon a condition that the front of a vehicle body is located ahead in a traveling direction. In addition, the inside denotes the center side of the vehicle body and the outside denotes its reverse side. Further, the backward inclination of a cylinder denotes a condition in which the upside of the cylinder in the vertical direction is inclined backward in the vehicle body.

2. Description of Background Art

A motorcycle is known that includes a V-type engine where an exhaust pipe on the side of a front cylinder extends downwardly in front of the front cylinder from the front cylinder and is turned under a crankcase and an exhaust pipe on the side of a rear cylinder extends downwardly through the back from the rear cylinder. The exhaust pipes are gathered at the back of the engine and are connected to a muffler. The muffler extends upwardly through the side of a rear wheel and air is taken in from the side of a V-type bank between the front and rear cylinders. See, for example, JP Patent No. 2722097.

In addition, a motorcycle is known where an exhaust pipe extends forward from the front of a cylinder of a forward inclined engine and extends downward in front of the cylinder and is turned under the engine. The exhaust pipe is connected to a muffler arranged below the rear of a crankcase and air is taken in from the upside at the diagonal back of the cylinder. See, for example, JP Patent No. 3962012.

When the structure of an air cleaner is arranged on the upside of a cylinder as in examples of the related art is adopted, an intake part is arranged on the upside of the cylinder, and the concentration of mass and the lowering of the center of gravity are made difficult. When it is desired that an intake part is optimally arranged, a vehicle body is compacted and heat exhausted from a radiator is cut off to prevent the heat from hitting an engine. Thus, a special member is required to be prepared. It is an object of the invention is to address such a problem.

The basic requirements for the vehicle body structure of a motorcycle is to provide a concentration of mass and a lowering of the center of gravity. As an intake part and an exhaust part are relatively heavy, a request is made for the arrangement. However, as exhaust parts are longitudinally distribution in a V-type engine vehicle as in an example of the related art, it is difficult to concentrate mass. In addition, as a muffler is located in a high position, it is difficult to lower the center of gravity.

Further, in a vehicle provided with a forward inclined engine, as an exhaust pipe is arranged in a substantial L type in a side view simply from the upside to the downside in front of a cylinder, mass easily shifts forward, as an intake part is located on the upside on the back side of the cylinder, the mass is similarly dispersed, and it is also difficult to lower the center of gravity. In addition, exhaust pipe length is reduced by arranging a muffler below a crankcase and output may decrease.

SUMMARY AND OBJECTS OF THE INVENTION

To address the problem, according to an embodiment of the present invention, a motorcycle is provided wherein an engine is arranged between front and rear wheels and an intake part and an exhaust part are connected to the front and the rear of a cylinder. A radiator is arranged in front of the cylinder with the cylinder being inclined backward. An intake port is provided in front of the cylinder with an exhaust port being provided at the back of the cylinder. The intake part is arranged in front of the cylinder and at the back of the radiator.

According to an embodiment of the present invention, the intake part is an intake box for taking air from the front side of a vehicle in and taking the air from the intake port in the engine, an air filter is arranged in the intake box and the air filter is formed in a substantial V type toward the front in a top view.

According to an embodiment of the present invention, a duct connected to the intake box is provided on the upside of the radiator and a stay for supporting the radiator by a vehicle body pierces the duct.

According to an embodiment of the present invention, the radiator and the cylinder form in a substantial V type in a side view and the intake part is arranged in substantial a V-type space.

According to an embodiment of the present invention, as the intake part is arranged in front of the cylinder and at the back of the radiator by arranging the radiator in front of the cylinder, inclining the cylinder backward, providing the intake port in front of the cylinder and providing the exhaust port at the back of the cylinder, the intake part can be concentrated in front of the cylinder and in the vicinity. Therefore, the concentration of mass and the lowering of the center of gravity can be realized, compared with a case wherein an intake part is arranged on the upside of a cylinder or at the back of a cylinder as in examples of the related art. Thus, the optimum arrangement of the intake part is realized, and the whole vehicle can be compacted. In addition, as the intake part is arranged between the cylinder and the radiator, heat exhausted from the radiator can be prevented from directly hitting an engine because the intake part cuts off the heat and a special member for cutting off heat is not required.

According to an embodiment of the present invention, as the air filer is arranged in the intake box which is the intake part and is formed in the substantial V type toward the front in the top view, the distance from the intake port can be secured and the passage length on the dirty side can be sufficiently secured.

According to an embodiment of the present invention, as the duct connected to the intake box is provided on the upside of the radiator and the stay for supporting the radiator by the vehicle body pierces the duct, an upper part of the radiator can be supported by the vehicle body without being obstructed by the duct though the duct is arranged on the upside of the radiator and the intake box and the radiator are closely arranged.

According to an embodiment of the present invention, as the radiator and the cylinder are arranged so as to form in the substantial V type in the side view, the substantial V-type space is formed and the intake part is arranged in the space, the intake part can be efficiently housed between the radiator and the cylinder.

According to an embodiment of the present invention, a concentration of mass is realized and a more remarkable lowering of the center of gravity is achieved as compared with the above-mentioned examples of the related art to thus secure a necessary and sufficient exhaust pipe length.

According to an embodiment of the present invention, a motorcycle is provided wherein an engine is arranged between front and rear wheels and an intake part and an exhaust part are connected to the front and the rear of a cylinder. The cylinder is inclined to the rear with an intake port that is provided in front of the engine and an exhaust port that is provided at the back of the engine. An exhaust pipe is connected to the exhaust port and extends in front of the cylinder from the back of the cylinder along the side and extends to the rear under the engine from the front side of the cylinder with a muffler connected to the exhaust pipe under the engine.

According to an embodiment of the present invention, the exhaust pipe extends from the exhaust port towards the back of the cylinder and afterward is divided into the exhaust upstream side and the exhaust downstream side in a part turned down beside the cylinder.

According to an embodiment of the present invention, an oil pan is provided in a lower part of a crankcase of the engine and protrudes more downward than a lower part of the crankcase on the rear side of the oil pan with the muffler being arranged between the back of the oil pan and the rear wheel.

According to an embodiment of the present invention, an exhaust duct extends sideways in a vehicle body from the center of the rear of the muffler.

According to an embodiment of the present invention, the exhaust duct is provided utilizing a body cover and exhaust gas is emitted sideways from a side opening formed on the body cover.

According to an embodiment of the present invention, as the cylinder is inclined to the rear, the exhaust pipe extends at the back of the cylinder and is bent back and is made to diagonally cross the side of the cylinder forward and downward, afterward the exhaust pipe is bent downward in front of the cylinder, is further bent under the crankcase and is connected to the muffler arranged below the crankcase. Thus, the mass can be concentrated by arranging the exhaust pipe around the backward inclined cylinder and the center of gravity can be lowered by arranging the muffler below the crankcase. In addition, the exhaust pipe length is provided by arranging the muffler below the crankcase that is swept away by the backward inclination of the cylinder and the arrangement of the exhaust pipe around the cylinder. Thus, a necessary and sufficient length can be secured, and the output of the engine can be enhanced.

According to an embodiment of the present invention, as the exhaust pipe extends from the exhaust port toward the back of the cylinder and afterward is divided into the exhaust upstream side and the exhaust downstream side in the part turned down beside the cylinder though the often bent structure is adopted for the exhaust pipe, the exhaust upstream side and the exhaust downstream side can be easily manufactured. Further, the assembly is also facilitated, and the case of assembly is enhanced.

According to an embodiment of the present invention, as the oil pan is provided in the lower part of the crankcase of the engine and is protruded more downward than the lower part of the crankcase on the rear side of the oil pan, the space for arranging the muffler is secured between the back of the oil pan and the rear wheel and the muffler can be arranged in the space. Therefore, as the center of gravity can be lowered by arranging the muffler in the lowest position of the engine and the muffler can be arranged close to the center of gravity of the engine. Thus, the mass can be concentrated.

According to an embodiment of the present invention, even if the muffler is arranged in front of the rear wheel, exhaust gas can be emitted sideways in the vehicle body away from the rear wheel through the exhaust duct.

According to an embodiment of the present invention, the exhaust duct can be provided utilizing the body cover and exhaust gas can be emitted sideways from the side opening formed on the side of the body cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
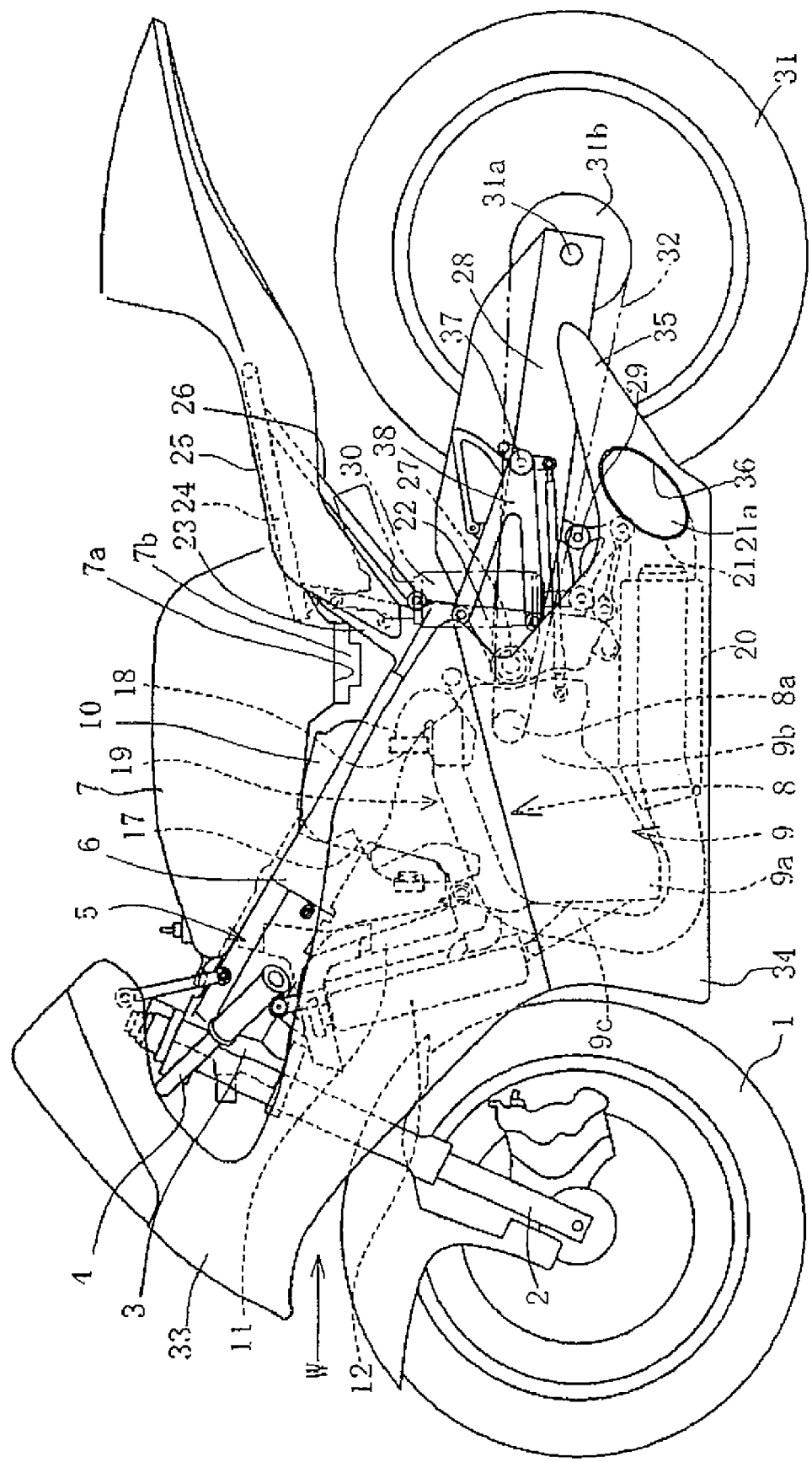
FIG. 1 is a side view showing the appearance of a motorcycle equivalent to an embodiment.
Figure 2:
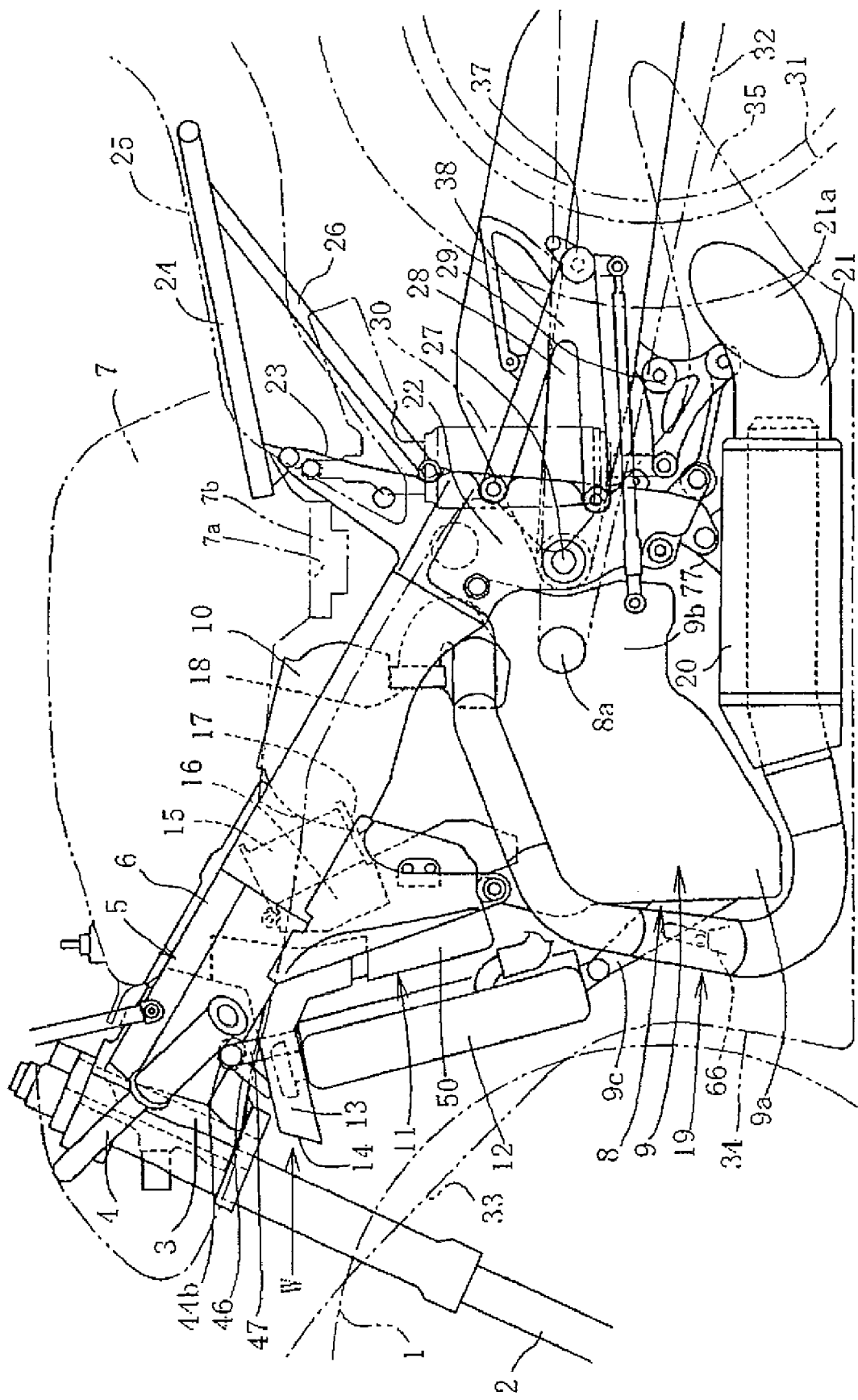
FIG. 2 is a side view showing a main part of the motorcycle.

Referring to the drawings, one embodiment will be described below. FIG. 1 is a side view showing the appearance in a state in which a body cover is installed of this motorcycle and FIG. 2 is a side view showing a main part of a vehicle body in which a part of appearance parts such as the body cover are shown by an imaginary line. In FIGS. 1 and 2, a front wheel 1 is provided wherein the front wheel is turnably supported by a head pipe 3 via a front fork 2, and is steered by a handlebar 4.

The head pipe 3 is provided to a front end of a body frame 5, a fuel tank 7 is supported on/by a main frame 6 extended diagonally downward and backward of the body frame, and an engine 8 is supported on the downside of the fuel tank. A downward protruded part 7b is formed from the rear of a bottom 7a of the fuel tank 7 and a built-in fuel pump (not shown) is attached to the downward protruded part. Space for housing the downward protruded part 7b is formed at the back of a cylinder 10 and on the upside of the main frame 6.

The engine 8 is provided with a crankcase 9 and the cylinder 10 is inclined backward on the upside of the crankcase. A lower part of the front of the crankcase 9 is most greatly protruded downward, functions as an oil pan 9a, and a transmission 9b is formed at the back of the oil pan. Road clearance between the bottom of the transmission 9b and the ground is made greater than road clearance between the bottom of the oil pan 9a and the ground.

The transmission 9b is located in a much higher position than the oil pan 9a of the crankcase 9 and a muffler 20 having a relatively large diameter and large capacity is located below the transmission.

The cylinder 10 is located under the fuel tank 7 and an upper part of the cylinder 10 is located close to the bottom of the fuel tank 7.

An intake box 11 is located in front of the cylinder 10. The intake box 11 is located between a radiator 12 located in front of the intake box and the cylinder 10 and an upper end of the intake box is fixed to the bottom of the fuel tank 7 with the upper end pressed on the bottom. An intake duct 13 is provided to an upper part of the intake box 11, an air intake guide port 14 at the end of the intake duct is overhanged in front of the radiator from the upside of the radiator 12, and running wind W (see FIGS. 1 to 3) is taken into the intake box 11 from the front side of the radiator 12. For the radiator 12, an upper part is supported by the main frame 6 and a lower part is supported by a stay 9c protruded from the front of the crankcase 9.

In the intake box 11, an intake funnel 15 and a throttle body 16 simply shown are housed. The intake funnel 15 is vertically arranged with the diagonal upside extending forward and diagonally upward and is connected to an intake port 17 formed at the front of the cylinder 10 with the intake port directed upward so as to supply intake air into the intake port 17 from the diagonal upside.

An exhaust port 18 directed to the rear is provided to the back side of the cylinder 10 and an exhaust gas is emitted through an exhaust pipe 19 from the exhaust port. The exhaust pipe 19 is once extended to the rear, is immediately bent by approximately 180° and is extended forward and diagonally downward, is bent downward in front of the crankcase 9 and is extended downward along the front, is further bent backward and is turned round under the crankcase 9, and is connected to the muffler 20 arranged below the transmission 9b. The exhaust gas sent into the muffler 20 is emitted into the outside air from a tail pipe 21 connected to the rear of the muffler 20.

The tail pipe 21 is bent by approximately 90° and an exhaust vent 21a at the end on the exhaust downstream side is open sideways.

As described above, the exhaust pipe 19 is formed as if the exhaust pipe winds around the cylinder 10 in a substantial sigmoid curve in a side view, as a result, the mass is remarkably concentrated, and the exhaust pipe length necessary and sufficient for the enhancement of the output together with the backward inclination of the cylinder 10 is realized.

A lower part of the transmission 9b is higher than the oil pan 9a and space for arranging the muffler is secured between the oil pan 9a and a rear wheel 31 at the back of the oil pan below the lower part. Therefore, the muffler 20 having a relatively large diameter and large capacity can be arranged in this space. As a result, as the center of gravity can be lowered by arranging the muffler 20 in the lowest position of the engine 8 in a state in which minimum road clearance similar to the oil pan 9a is secured under the muffler 20. Thus, the muffler 20 can be arranged close to the center of gravity of the engine 8 and the mass can be concentrated.

A center frame 22 vertically extended is connected to a rear end of the main frame 6 and a strut 23 is protruded diagonally upward and to the rear from an upper end of the center frame. A seat rail 24 is extended diagonally upward and to the rear from an upper end of the strut 23 and supports a rear end of the fuel tank 7 and a seat 25. A rear stay 26 is provided that fastens a lower part of the strut 23 and the seat rail 24. The center frame 22, the strut 23, the seat rail 24 and the rear stay 26 are each provided on each of right and left sides.

The center frame 22 is diagonally vertically extended along the rear of the transmission 9b which is the rear of the crankcase 9 and a front end of a rear arm 28 is vertically rockably supported by a pivot 27 in a vertical intermediate part of the center frame. The front of the rear arm 28 is coupled to the strut 23 via a link 29 provided to a lower part of the rear arm by a rear shock absorber 30.

The rear wheel 31 is supported by a rear end of the rear arm 28 and is driven by a drive sprocket 8a of the engine 8 via a chain 32. An axle 31a of the rear wheel and 31b denotes a driven sprocket.

The exhaust pipe 19 is provided with a first bent part 19a extending from the exhaust port 18 and bent forward immediately after, a second bent part 19b bent downward in front of the crankcase 9 and a third bent part 19c bent under the crankcase from the front side of the crankcase 9. The third bent part 19c turns round an end of the oil pan 9a of the crankcase 9. As described above, the exhaust pipe 19 is formed round the cylinder 10 in a substantial S type in a side view, the remarkable concentration of mass is realized, and sufficient exhaust pipe length required for the enhancement of output together with the backward inclination of the cylinder 10 is realized. A degree of the backward inclination of the cylinder 10 is arbitrarily determined according to required exhaust pipe length. However, the more the cylinder is inclined to the rear, compared with an upright cylinder, the longer exhaust pipe length can be made.

The vehicle body is covered with the body cover. The body cover is provided with an upper cover 33 that covers the front of the head pipe 3 and each side of the radiator 12, the intake box 11 and the cylinder 10 and a lower cover 34 that covers the side of a lower part of the engine 8 below the radiator 12. The upper cover 33 and the lower cover 34 are vertically divided by a parting line extending forward and diagonally downward on the side of the vehicle body.

The lower cover 34 covers the exhaust part on the lower side including a lower part of the exhaust pipe 19. A rear end of the lower cover 34 is provided with an overhanged part 35 overhanged up to the vicinity of the center of the side of the rear wheel 31, a side opening 36 open sideways is formed in a position located in the base of the overhanged part 35 and overlapped with the rear wheel 31, the exhaust vent 21a of the tail pipe 21 is opposite to the side opening, and the exhaust gas is emitted outside the vehicle body via the exhaust vent.

A step 37 is located on the upside of the overhanged part 35. The step 37 is provided to a rear end of a step holder 38 protruded to the rear from the center frame 22 in a substantial V type. The exhaust vent 21a is located on the downside of the step 37 and is open outward and diagonally upward.

Figure 3:
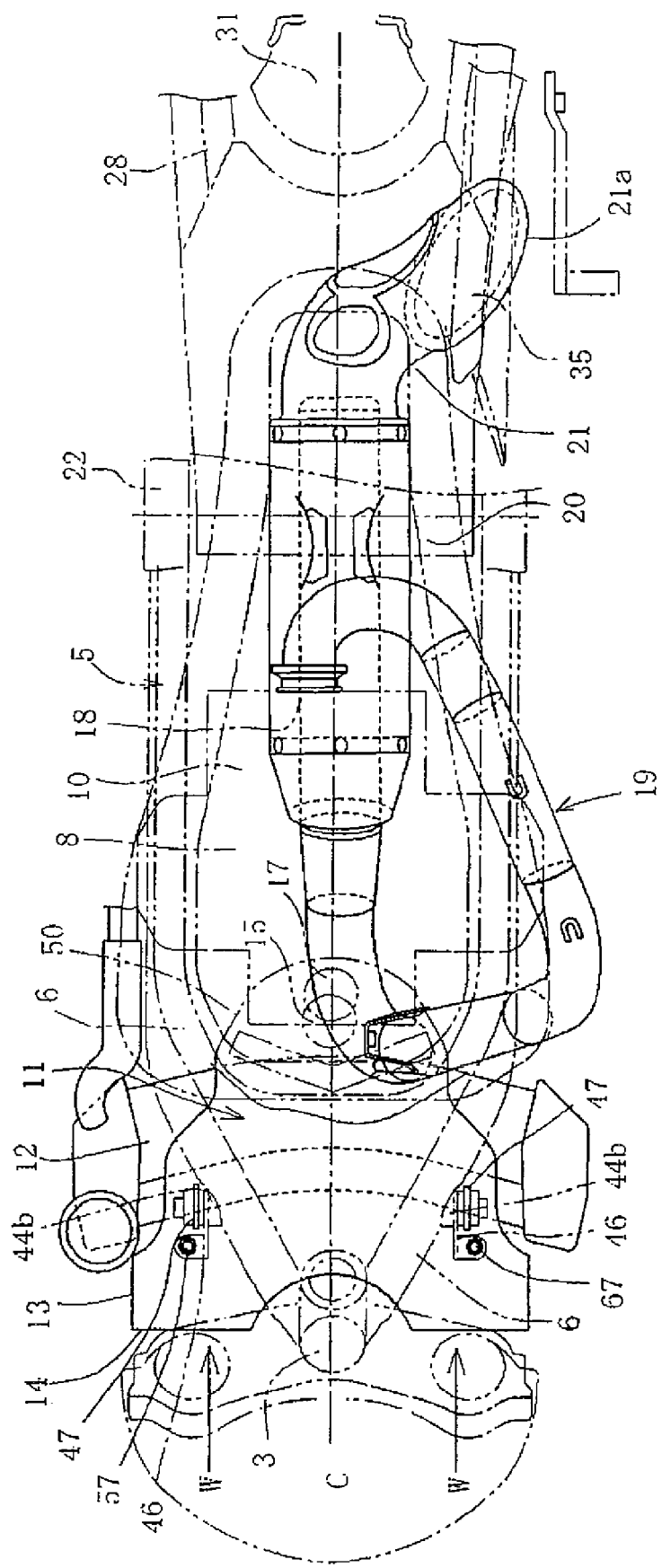
FIG. 3 is a plan showing the main part of the motorcycle.

FIG. 3 is a plan showing a main part. A pair of right and left main frames 6 extend to the rear from the head pipe 3 with the distance between them increasing. A pair of right and left seat rails 24 and a pair of right and left rear stays 26 are also provided though they are not shown in FIG. 3. The front side of the intake box 11 is as wide as an interval between the right and left front forks 2 and the rear side is gradually narrowed. The intake duct 13 extends forward over the radiator 12 and a flow of air is taken in from the air intake guide port 14 located at the back of the front fork 2.

A rear wall of the intake box 11 is located close to the front of the cylinder 10, the intake port of the cylinder 10 is further located close to a lower part of the rear wall, and a lower part of the intake funnel 15 is connected to the intake port 17.

The radiator 12 is arranged crosswise in a direction of the vehicle width (in a lateral direction) and has a curved surface acquired by protruding an intermediate part in the lateral direction to the rear.

An end on the exhaust upstream side connected to the exhaust port 18 of the exhaust pipe 19 is located in the vicinity of the center C of the vehicle body (with the end slightly biased on the right side) and the muffler 20 is located on the center C of the vehicle body. The exhaust pipe between the first bent part 19a and the second bent part 19b is gradually overhanged outward (leftward) first backward and then forward and the exhaust pipe is bent toward the center C of the vehicle body from the second bent part 19b. The third bent part 19c is located on the center C of the vehicle body, and afterward, the exhaust pipe is connected to the muffler 20 located on the center C of the vehicle body along the center C of the vehicle body.

A boss 44b is provided for mounting the stays 46, 47 and each boss is laterally provided to the side of the main frame 6.

Figure 4:
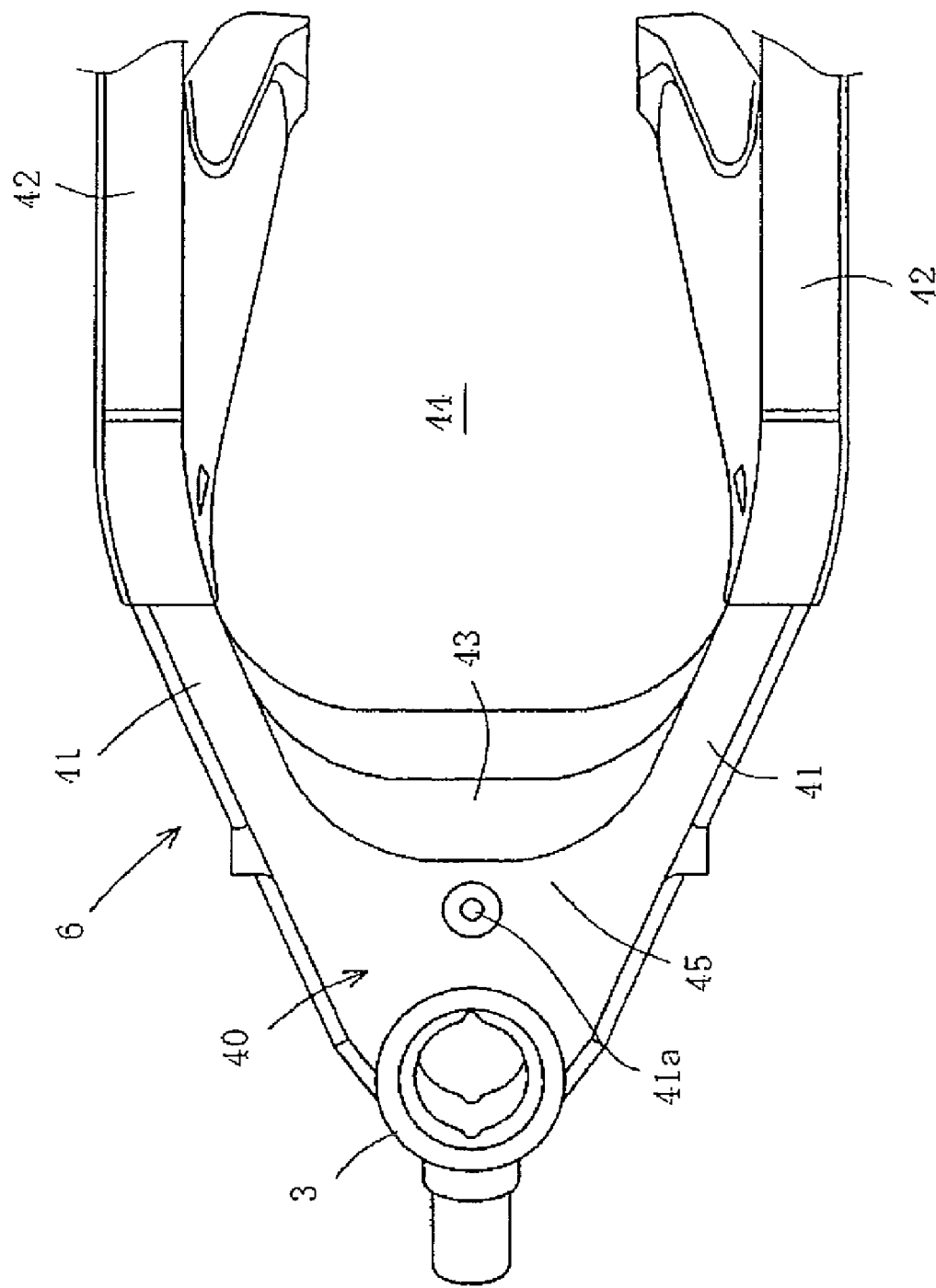
FIG. 4 is a plan showing a main part of a body frame.

FIG. 4 is a plan showing the main frame 6 of the vehicle body. The head pipe 3 is integrated with a front end of a head 40 in a substantial V type widened backward in a top view. The head 40 is made of a light alloy by casting or stamping. Each front end of right and left square pipe parts 42 is connected to each arm 41 extended to the rear in the lateral direction and the intake box 11 (see FIG. 1) is housed in the space 44 surrounded by the arms 41, the square pipe parts 42 and a back wall 43 of the head 40. At this time, a circumference of an upper end of the intake box 11 is overlapped with the rear of a top face of a cross part 45 at the back of the head pipe 3 on each top face of the arm 41 and the square pipe part 42 and on a top face of the back wall 43. A boss 41a is provided for mounting a front end of the fuel tank 7.

Figure 5:
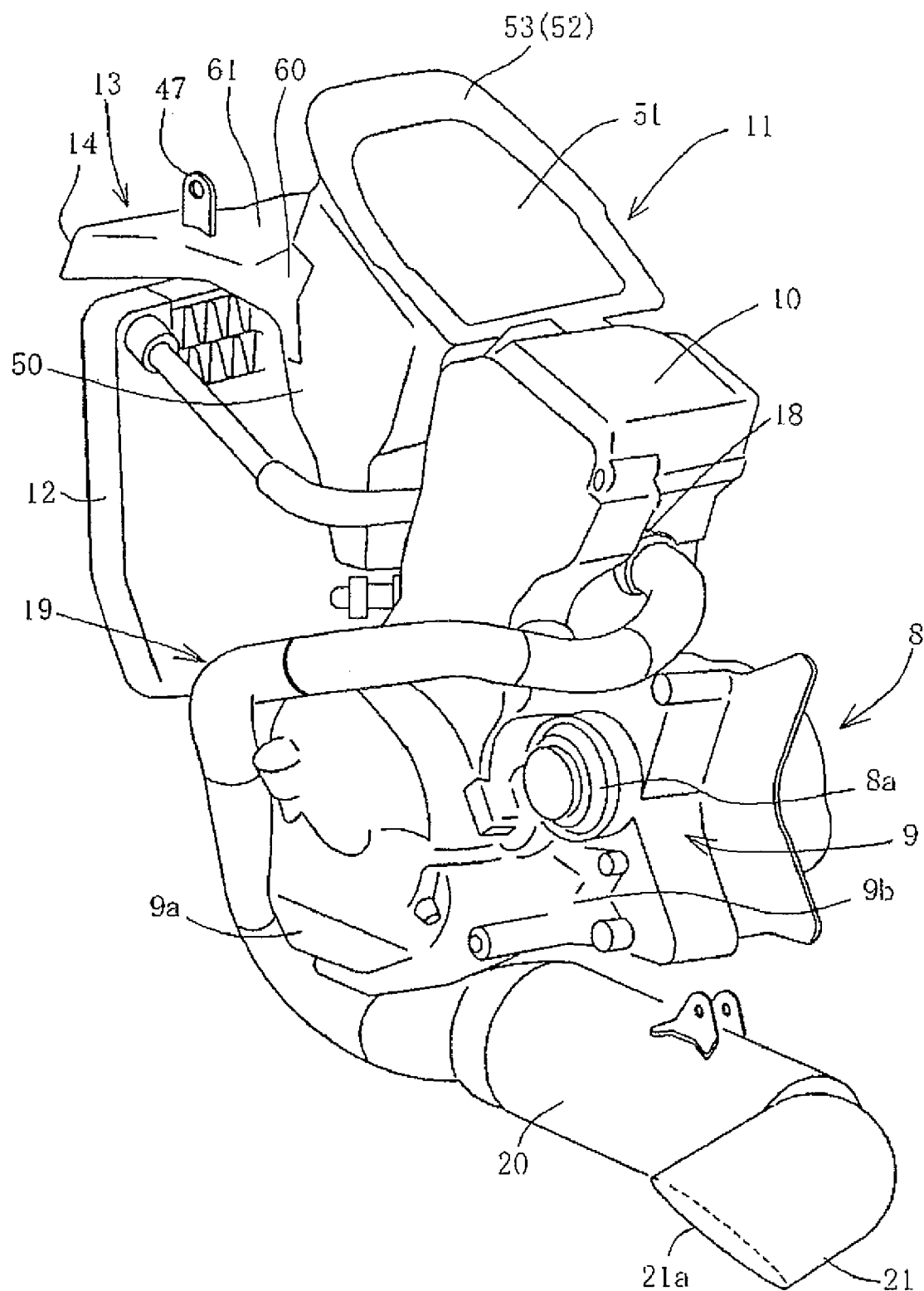
FIG. 5 is a perspective view showing the arrangement of an intake part and an exhaust part from the diagonal back.

FIG. 5 is a perspective view showing the arrangement of the intake part and the exhaust part. The intake box 11 houses a lower half of a body 50 in a substantial V type space formed between the radiator 12 inclined forward and the cylinder 10 inclined to the rear. The intake duct 13 is protruded in front of the radiator 12 over the radiator 12. The stay 47 extends from a top face of the radiator 12 pierces the intake duct 13 and is protruded upwardly, and an upper end of the stay is supported by a bottom of the main frame 6.

The exhaust pipe 19 first extend to the rear from the exhaust port 18, is curved in a space formed between the back of the cylinder 10 and a top face of the transmission 9b of the crankcase 9 extends forward along a joint of the cylinder 10 and the crankcase 9 over the side of the engine 8, is bent again in front of the cylinder 10 and extends downward in space formed between a lower end of the radiator 12 and a lower part of the front of the oil pan 9a. The exhaust pipe is arranged utilizing the clearance formed between each part as described above.

The first bent part 19a is a three-dimensionally bent in a substantial U type in a top view and in a side view. A part approaching the second bent part 19b after 19e at which the exhaust pipe turns along the side of the cylinder 10 extends along the side of the cylinder 10, and the bent part 19e is a part of the first bent part 19a.

Figure 6:
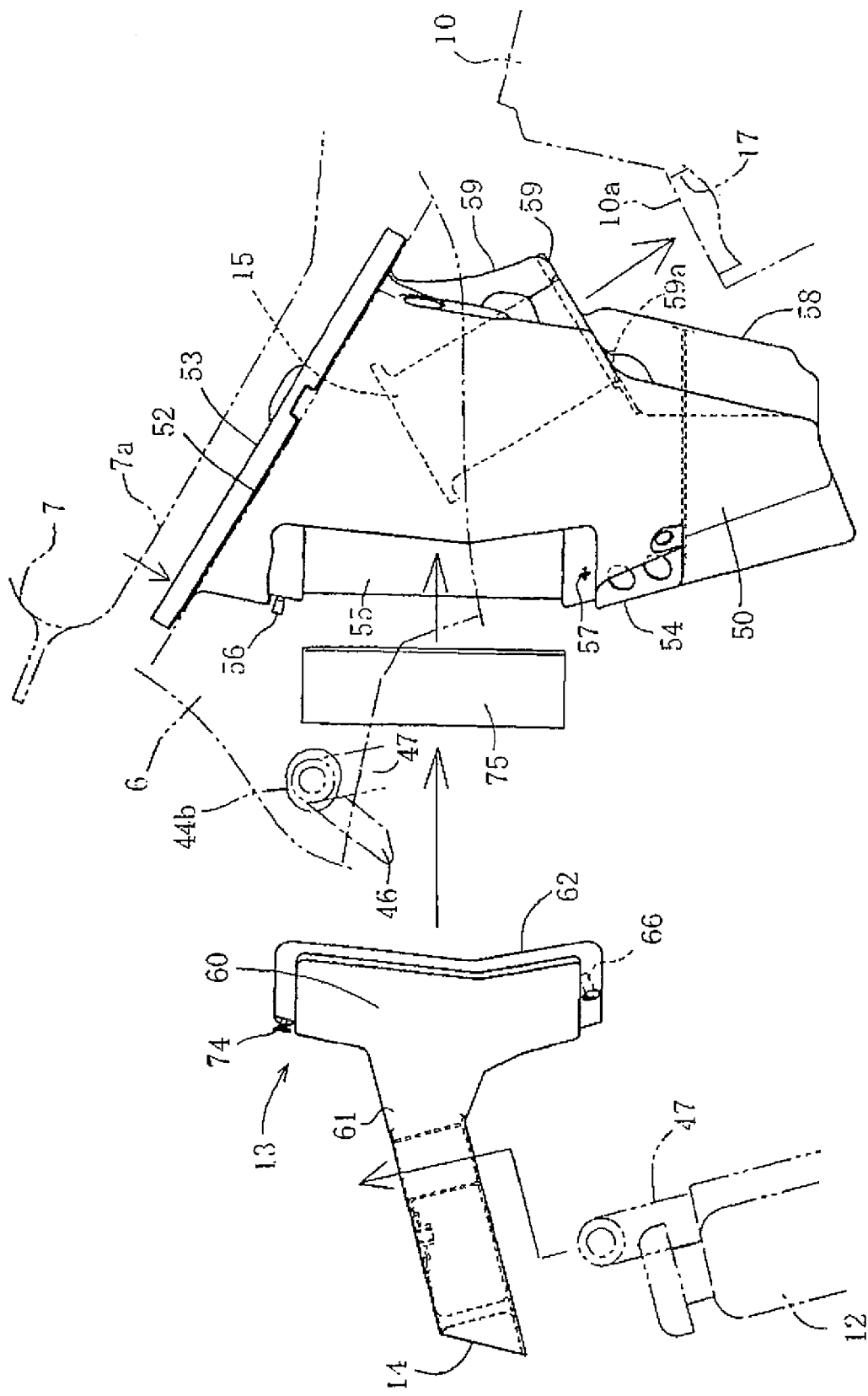
FIG. 6 shows an exploded intake box and parts around it.

Next, the intake box 11 will be described further in detail. FIG. 6 is an exploded view showing the intake box 11 and shows the side shape of each component. The intake box 11 is divided into the body 50 and the intake duct 13. The body 50 is made of resin and is in the shape of a box open upward and forward and longer vertically. A flange 52 forming an edge of an opening 51 (see FIG. 5) and bent outside at a substantial right angle is formed in an upper part of the body and is inclined to the rear and diagonally downward in a side view. A seal 53 is provided on the flange 52 and the opening 51 at the upper end is sealed because the bottom 7a of the fuel tank 7 is put on the seal 53.

A window hole 55 is formed in a front wall 54. The window hole 55 is covered with the intake duct 13 via a filter element 75. A stepped part 59 is provided to the back 58 of the body 50 and a stepped part 10a is provided to which the intake port 17 is open to the cylinder 10 inclined to the rear and is overlapped with the stepped part. A through hole 59a is bored in the stepped part 59, a lower end of the intake funnel 15 (see FIG. 2) is protruded from the through hole, and is connected to the stepped part 10a.

The intake duct 13 is made of resin, a lid 60 and a duct part 61 are integrated and are in a substantial T type in a side view, and the lid 60 is overlapped with the window hole 55. The duct part 61 is integrally extended forward from the center in a vertical direction of the lid 60 and its end is cut diagonally downward in front to be the air intake guide port 14 open forward.

The stay 47 protruded from the top face of the radiator 12 pierces the duct part 61 from the downside to the upside and is supported by the side of the main frame 6.

Figure 7:
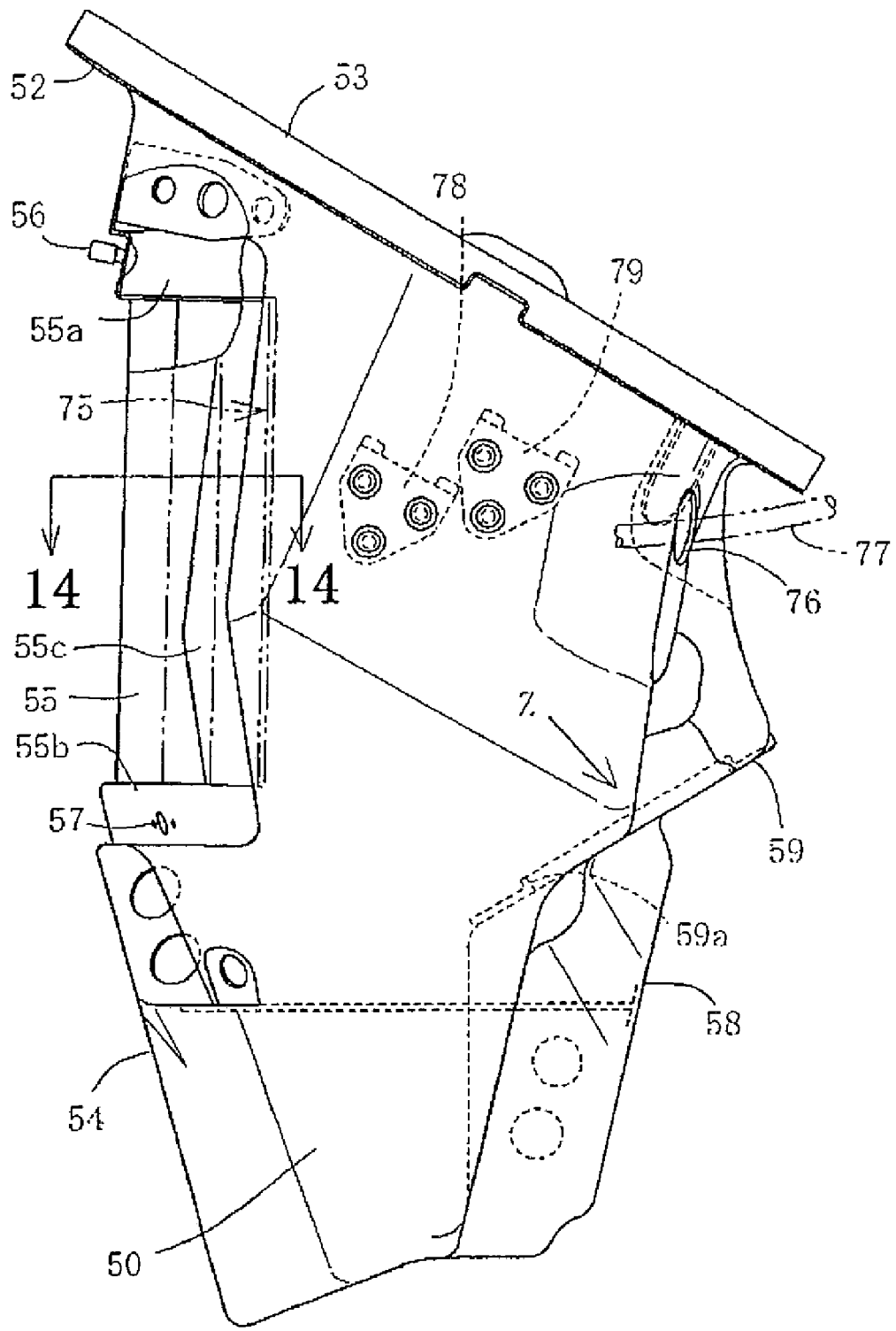
FIG. 7 is a side view showing a body.
Figure 8:
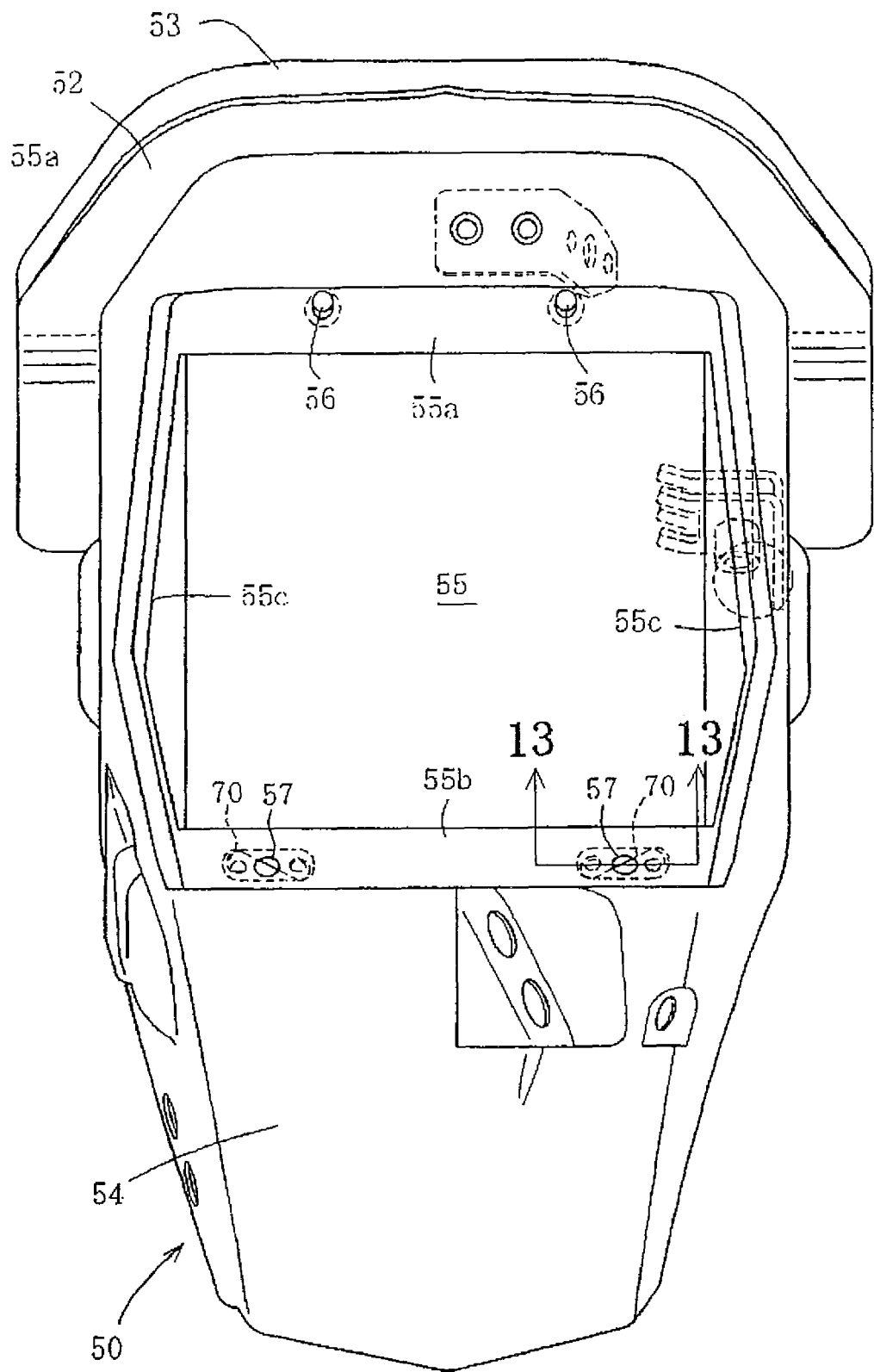
FIG. 8 is a front view showing the body.

FIG. 7 is a side view showing the body 50 and FIG. 8 is a front view. The window hole 55 is greatly open by a substantial lateral width in the center of the front. An upper edge 55a and a lower edge 55b of a stepped edge surrounding the window hole 55 of the opening are vertically formed. Right and left side edges 55c are substantially doglegged in a side view. A stud 56 protruded forward is provided to the upper edge 55a and a fitting hole 57 is formed in the lower edge 55b. These are provided to fit the intake duct 13. A pair of right and left studs 56 are formed in the upper edge 55a. A pair of right and left fitting holes 57 are also formed in the lower edge 55b. A fastener spring 70 is provided to the fitting hole 57 in a substantial S type with the fastener spring crossing the fitting hole.

As shown in FIGS. 7 and 8, a reference numeral 76 denotes a piping hole formed in an upper part of the back of the body 50 and is open to the rear. A high-pressure fuel pipe 77 is inserted into this hole from a bottom of the fuel pump attached to the downward protruded part 7b (see FIG. 2) of the fuel tank 7. The fuel pipe continues to the throttle body 16 (see FIG. 2) in the body 50. Sensor supporting plates 78, 79 are provided.

Figure 9:
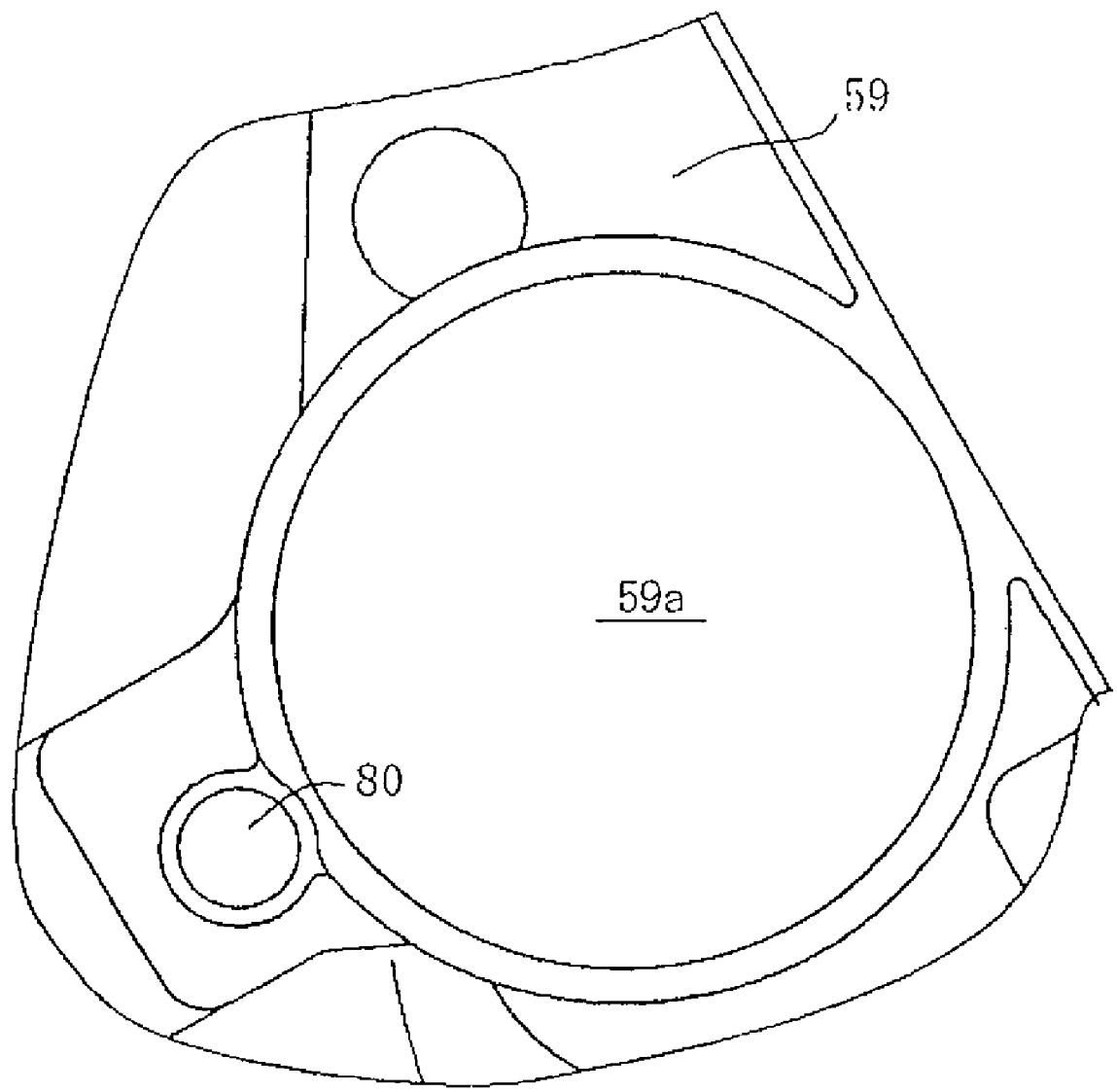
FIG. 9 is a view viewed from a direction shown by an arrow Z in FIG. 7.

FIG. 9 shows the stepped part 59 viewed from a direction shown by an arrow Z in FIG. 7. As is clear from FIG. 9, the through hole 59*a* having a large diameter for passing the intake funnel 15 that is bored in the stepped part 59. A small hole 80 for mounting an injection nozzle is provided to the periphery of the through hole 59*a*.

Figure 10:
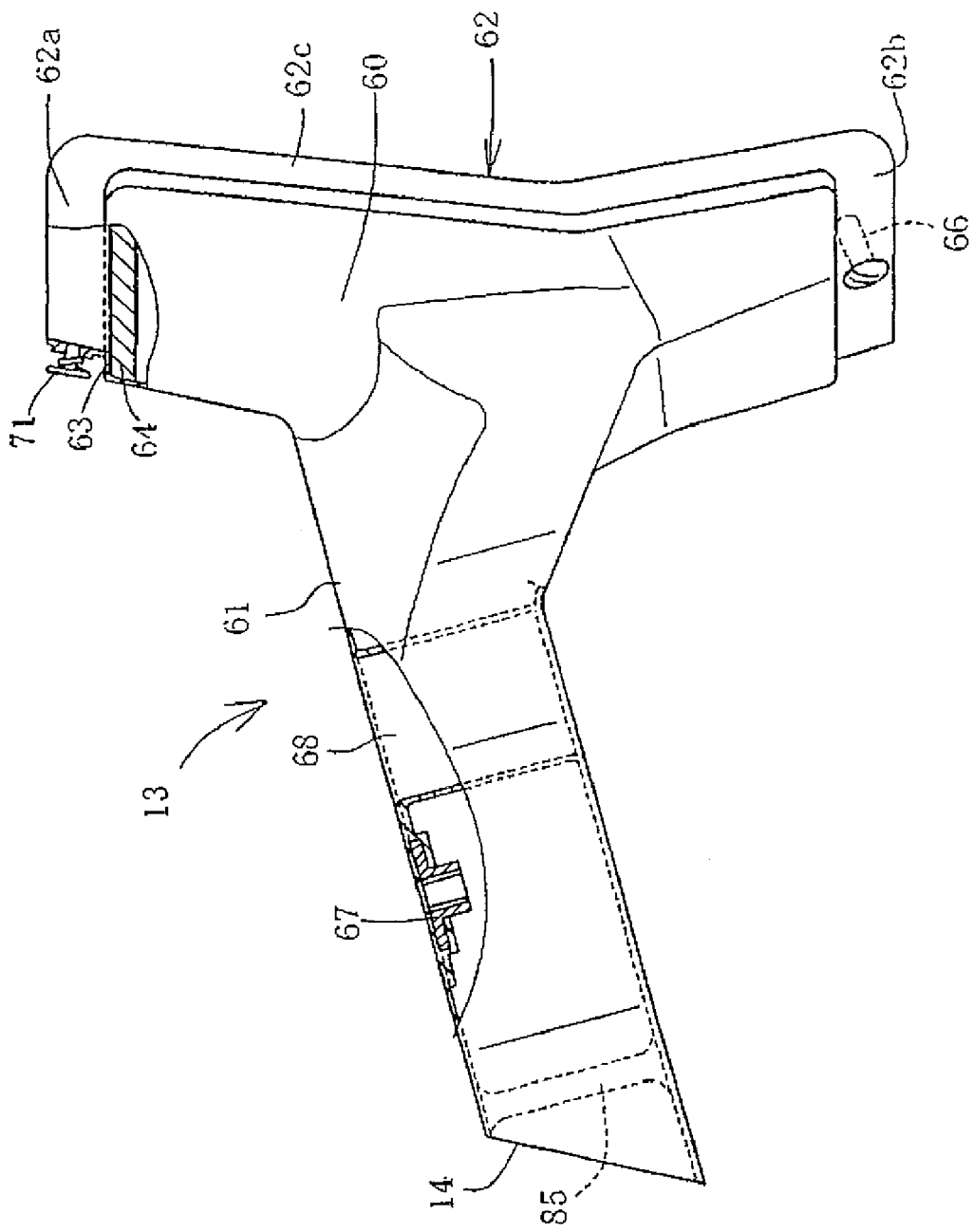
FIG. 10 is a side view showing an intake duct.
Figure 11:
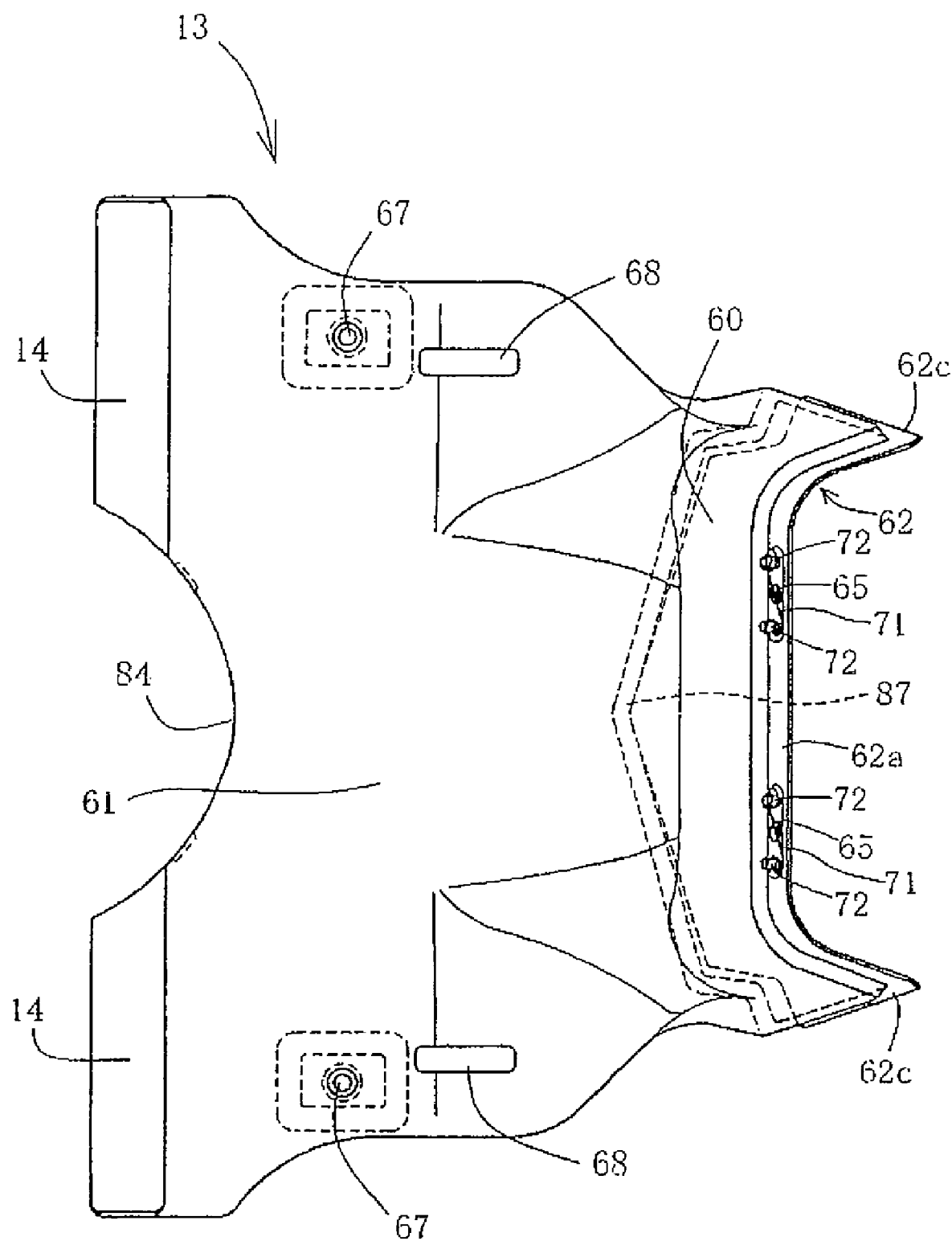
FIG. 11 is a front view showing the intake duct.
Figure 12:
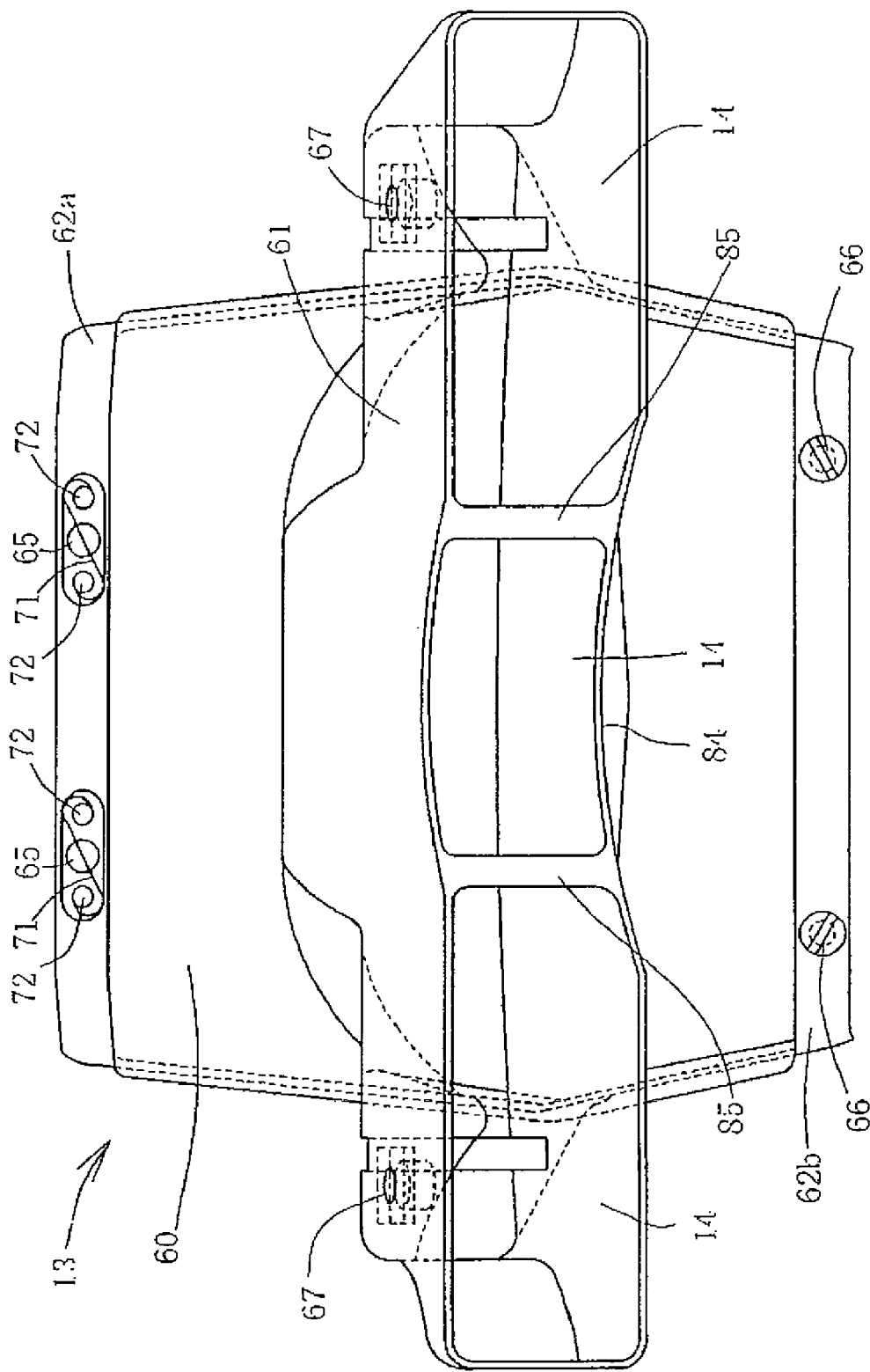
FIG. 12 is a plan showing the intake duct.

FIG. 10 is a side view showing the intake duct 13, FIG. 11 is a plan showing the intake duct, and FIG. 12 is a front view showing the intake duct. In FIGS. 10, 11 and 12, a stepped fringe 62 is formed in the periphery of the lid 60 to overlap the fringe with the periphery of the window hole 55 and the fringe 62 includes an upper edge 62*a* and a lower edge 62*b* which are vertically provided and a lateral side edge 62*c*.

The upper edge 62*a* is overlapped with the upper edge 55*a* surrounding the window hole 55 of the body 50, the lower edge 62*b* is similarly overlapped with the lower edge 55*b*, and the lateral side edge 62*c* is overlapped with the side edge 55*c*.

A fitting hole 65 for passing the stud 56 provided to the upper edge 55*a* of the body 50 and a fastener spring 71 for fitting the stud 56 are provided on the right and left sides of the upper edge 62*a*. A stud 66 for fitting into the fitting hole 57 provided on the right and left sides of the lower edge 55*b* of the body 50 is protruded backward from the lower edge 62*b*.

The side edge 62*c* is bent in the substantial shape of a dogleg like the side edge 55*c*. The intake duct 13 covers the window hole 55 and is integrated with the body 50 by fitting the fastener spring 71 and the stud 66 to the stud 56 and the fastener spring 70 respectively in the periphery of the window hole 55 by overlapping the fringe 62 which is the periphery of the lid 60 of the intake duct 13 with the periphery of the window hole 55.

A seal 64 is provided inside a stepped part 63 of the fringe 62 and is airtightly overlapped with an edge of the window hole 55.

The duct part 61 is hollow, a mounting nut 67 is integrated with its ceiling, the duet part is fastened to an end of the stay 46 (see FIG. 6) extending from the main frame 6 with a bolt, and the duct part is attached to the main frame 6. A vertical through hole 68 is formed at the back of the mounting nut 67 and is partitioned off the inside of the duct part 61 by ambient walls. As for the mounting nut 67 and the through hole 68, each pair is provided on the right and left sides. The through hole 68 is a rectangular opening long in a longitudinal direction. The stay 47 (see FIGS. 5 and 6) pierces the through hole 68 from the downside to the upside, rubber-mounts the radiator 12 on the side of the main frame 6, and supports the radiator, controlling vibration. At this time, the stay 46 is also jointly fastened and rubber-mounted.

The opening area of the air intake guide port 14 is increased by being diagonally cut and a semi-circular recess 84 for preventing the head pipe 3 from hitting is formed in the lateral center. A pair of right and left vertical ribs 85 are provided to the recess 84 and reinforce the air intake guide port 14. An air intake guide passage from the air intake guide port 14 to the side of the lid 60 is formed inside the duct part 61 and communicates with the body 50 via an opening in the lid 60. As shown in FIG. 11, a stepped part 87 convex forward in a substantial V type in a top view is provided in the vicinity of the opening and the filter element 75 (see FIG. 6) is positioned there. The filter element 75 will be described later.

Figure 13:
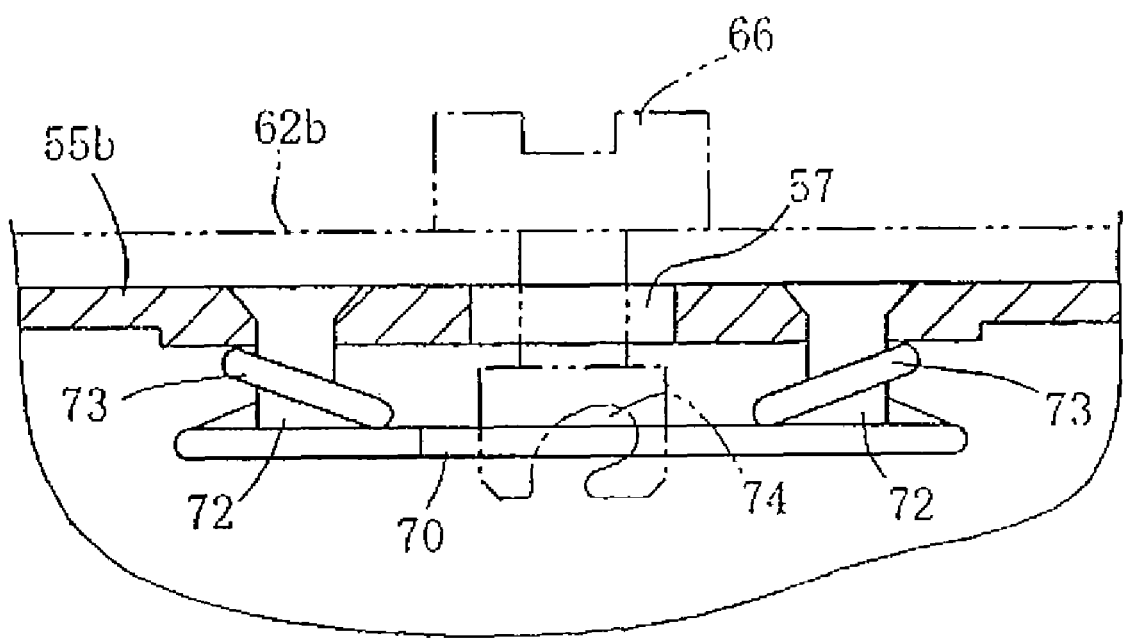
FIG. 13 is a sectional view viewed along a line 13-13 in FIG. 8.

FIG. 13 is a sectional view viewed along a line 13-13 in FIG. 8. Both ends of the fastener spring 70 are supported by a pair of rivets 72 formed with the fitting hole 57 between the pair. Both ends of the fastener spring are coiled elastic parts 73 and are protruded from the lower edge 55*b*, and an intermediate part crosses over the fitting hole 57.

The stud 66 is protruded from the fitting hole 57, the intermediate part of the fastener spring 70 is inserted into a fitting groove 74 formed on the side of the end of the stud, the fastener spring is elastically deformed by turning the stud 66 and is fitted into the annular groove 74 formed on the end of the stud 66, and the lower edge 62*b* on the side of the intake duct 13 is pressed on the lower edge 55*b* on the side of the body 50. Thus, satisfactory sealing performance is maintained, and the intake duct 13 can be detachably attached promptly and simply. The stud 56 and the fastener spring 71 also have a similar structure.

Figure 14:
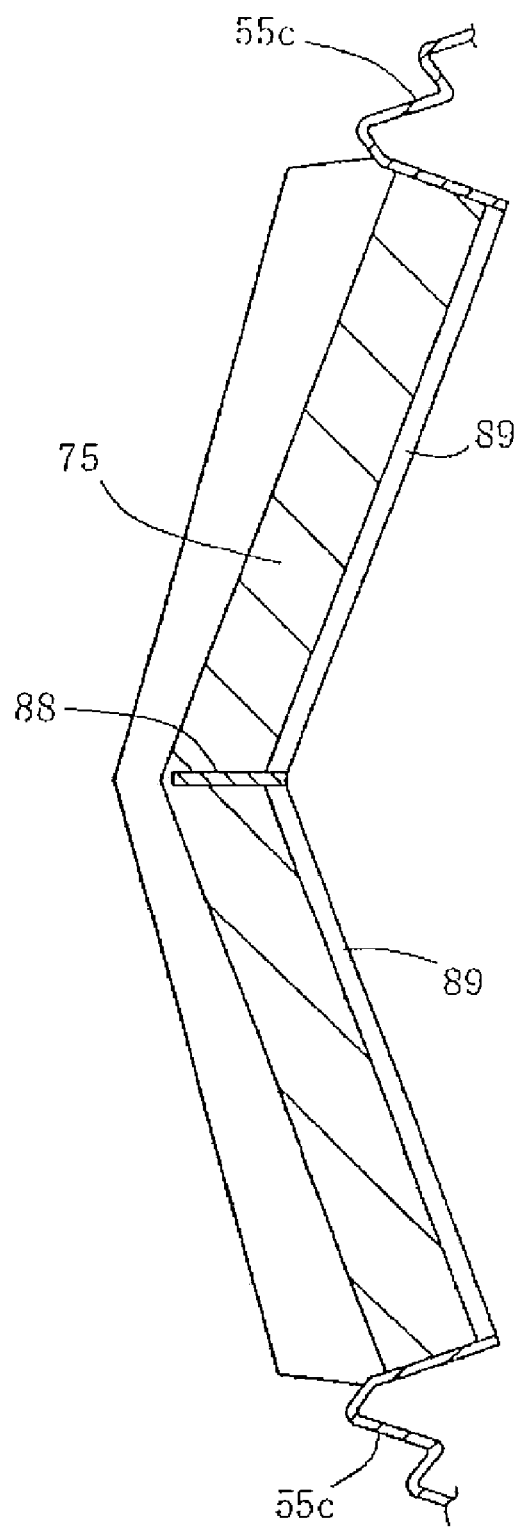
FIG. 14 is a sectional view viewed along a line 14-14 in FIG. 7.

FIG. 14 is a sectional view viewed along a line 14-14 in FIG. 7 and rear ends on both sides of the platelike filter element 75 are fitted and supported to/by the inside of each side edge 55*c*. The circumference of the outside surface of the filter element 75 is supported by the stepped part 87 provided to the duct part 61 of the intake duct 13. A supporting plate 88 is vertically provided to the center of the filter element 75 and the protruded V type is maintained. A frame 89 is provided.

The side edge 55*c* has a wavy section and the fitting to the side edge 62*c* having the similar section on the side of the intake duct 13 corresponding to this is ensured.

The filter element 75 covers the whole window hole 55 and the circumference of the filter element 75 is fixed by attaching the intake duct 13 onto the filter element and attaching the fringe 62 of the intake duct 13 to the periphery of the window hole 55.

The filter element 75 is made of well-known material such as sponge and outside air taken in from the intake duct 13 is purified by attaching the filter element 75. That is, the whole body 50 is located on the clean side and the intake duct 13 is located on the dirty side.

At this time, the distance to the intake port 17 can be secured by forming the filter element 75 in the substantial V type convex forward in the top view and passage length on the dirty side can be sufficiently secured.

Next, the action of this embodiment will be described. When the filter element 75 is fitted into the window hole 55 and further, the intake duct 13 is attached as shown in FIG. 6, the filter element 75 can be easily fixed. As the intake duct 13 can be attached/detached promptly and easily, the maintenance such as the replacement of the filter element 75 is easy.

When the body 50 integrated with the intake duct 13 is inserted into the space 44 shown in FIG. 4 from the upside, the flange 52 (see FIGS. 7 and 8) is put on the right and left main frames 6, further, as shown in FIG. 6, the stepped part 59 is fitted to the stepped part 10*a* of the cylinder 10, the fuel tank 7 is put on the main frames 6 from the upside, the front end of the fuel tank 7 is fastened to the boss 41*a* (see FIG. 4) provided to the head 40 with a bolt. The rear end of the fuel tank is fitted and attached to a cross part of the seat rails 24 though not shown. The fuel tank 7 is supported on the body frame 5, and simultaneously, as the front of the bottom 7*a* is overlapped with the flange 52, the flange 52 is fixed onto the main frame 6 via the seal 53 with the flange between the bottom 7*a* of the fuel tank 7 and the main frame.

Therefore, a special fixing member such as a bolt for fixing the body 50 of the intake box 11 on the vehicle body side can be omitted and the attachment of the body is also facilitated. In addition, as the seal 53 is closely joined to the bottom 7*a* of the fuel tank 7, the upper part of the body 50 is left open, and a special lid for covering the opening 51 is not required, securing sealing performance. In other words, the fuel tank 7 also functions as the lid.

The body 50 of the intake duct 13 is housed in the space in the substantial V type formed between the radiator 12 and the cylinder 10 and the front wall 54 is closely arranged along a front wall of the cylinder 10. Further, as the air intake guide port 14 of the duct part 61 of the intake duct 13 is protruded forward over the radiator 12, an interval between the radiator 12 and the cylinder 10 can be narrowed. Thus, the intake part is concentrated in the vicinity of the cylinder 10, and the concentration of the mass is enabled.

In addition, the radiator 12 is hung in the space 44 in the vicinity of the head pipe 3 and can be supported by providing the through hole 68 to the duct part 61, inserting the stay 47 into the through hole and supporting the upper end of the stay 47 by the boss 44b (see FIG. 3) provided to the side of the main frame 6 via rubber, controlling vibration. A lower part of the radiator 12 can be firmly supported by the crankcase 9 via the stay 9c (see FIG. 2).

As the intake funnel 15 in the body 50 shares the through hole 59a with the intake port 17 (see FIG. 6) by mounting the stepped part 59 on the stepped part 10a of the cylinder 10, the intake box 11 is integrated with the backward inclined cylinder 10 by connecting the lower end of the intake funnel 15 to the intake port 17.

A flow of air W taken in from the air intake guide port 14 reaches the window hole 55 from the lid 60 through the inside of the duct part 61, is purified by the filter element 75 there, and enters the body 50. As the intake funnel 15 is diagonally open toward the window hole 55 at the back of the center of the window hole 55 in the body 50, the flow of air enters the intake funnel 15 from an upper end of the intake funnel 15 to be further air-fuel mixture together with fuel injected from the throttle body 16 (see FIG. 2) and substantially linearly enters the intake port 17.

As this intake passage is substantially linear and is relatively short, the flow velocity of air is fast and intake air can be supplied to the intake port 17 at a high charging efficiency. Therefore, the optimum arrangement of the intake part is enabled. In addition, as the throttle body 16 is housed in the body 50 located on the clean side, a bad effect by dust and others on precise electronic parts can be excluded. Further, as the filter element 75 is arranged in the substantial V type convex forward in the top view, the distance up to the intake port 17 can be secured and the passage length on the dirty side can be sufficiently secured.

As the body 50 of the intake box 11 covers the front of the cylinder 10, wind exhausted from the radiator 12 is blocked by the body 50, does not directly hit the cylinder 10, and the cylinder can be effectively insulated from heat. Further, as the exhaust pipe 19 extends from the back of the cylinder 10 inclined to the rear and is arranged in the substantial S type in the side view with the exhaust pipe diagonally crossing the cylinder 10, the concentration of the mass and the lowering of the center of gravity are enabled, securing a sufficient exhaust pipe length and the arrangement can contribute to the whole compactness.

In addition, the muffler 20 having a large diameter can be efficiently arranged in the center of the vehicle body by arranging the muffler below the transmission 9b, securing the minimum road clearance of the vehicle body sufficiently by required quantity, the further concentration of the mass and the further lowering of the center of gravity are enabled, and the arrangement can contribute to the whole compactness.

Figure 15:
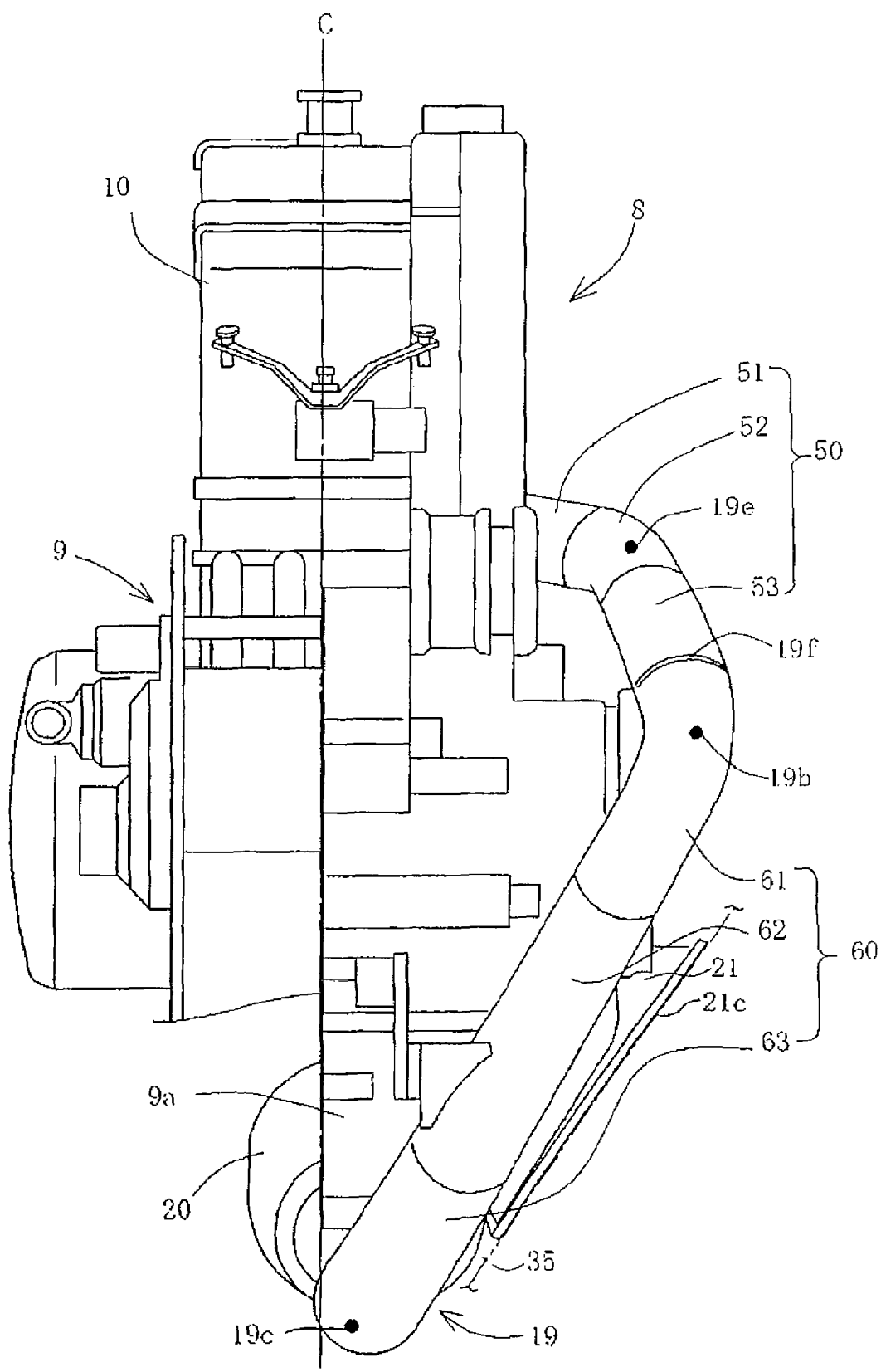
FIG. 15 is a front view showing an engine.

FIG. 15 shows the engine 8 from the front side and a lower part of a right case 9R of the crankcase 9 is omitted. A left case 9L is provided. The second bent part 19b overhangs further outward than an outermost protruded part of the left case 9L of the crankcase 9. A part from the second bent part 19b to the third bent part 19c is substantially linearly diagonally arranged from the second bent part 19b on the upside to the third bent part 19c on the downside toward the center side of the vehicle body, and the third bent part 19c and the muffler 20 are located on the center C of the vehicle body. This inclination is close to the inclination equivalent to a substantial banking angle of the side of the overhanged part 35. An edge 21c of the exhaust vent of the tail pipe 21 is formed to have a diagonal cut line so that its lower side is close to the center C of the vehicle body in a front view.

The exhaust pipe 19 is divided into an upper part 50 on the exhaust upstream side from the first bent part 19a to the second bent part 19b and a lower part 60 on the exhaust downstream side from the second bent part 19b to the muffler 20 and can be detachably connected in the vicinity of the second bent part 19b. A parting line 19f is provided. As described above, as the upper part 50 and the lower part 60 are respectively bent in substantially reverse directions and can be separately manufactured by parting the vicinity of the second bent part 19b and the side of the first bent part 19a though structure that the exhaust pipe 19 that is often bent. Each part of the exhaust pipe is easily manufactured and further, as the parting line 19f is provided to a substantially linear part from the first bent part 19a to the second bent part 19b and the first bent part and the second bent part are connected along the parting line, the assembly is also facilitated.

Figure 16:
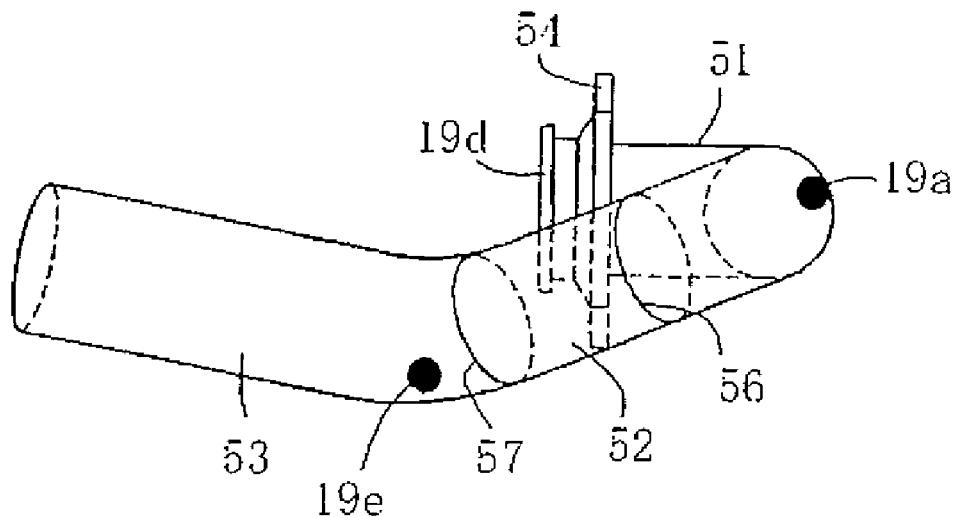
FIG. 16 is a side view showing an upper part of the exhaust pipe.
Figure 17:
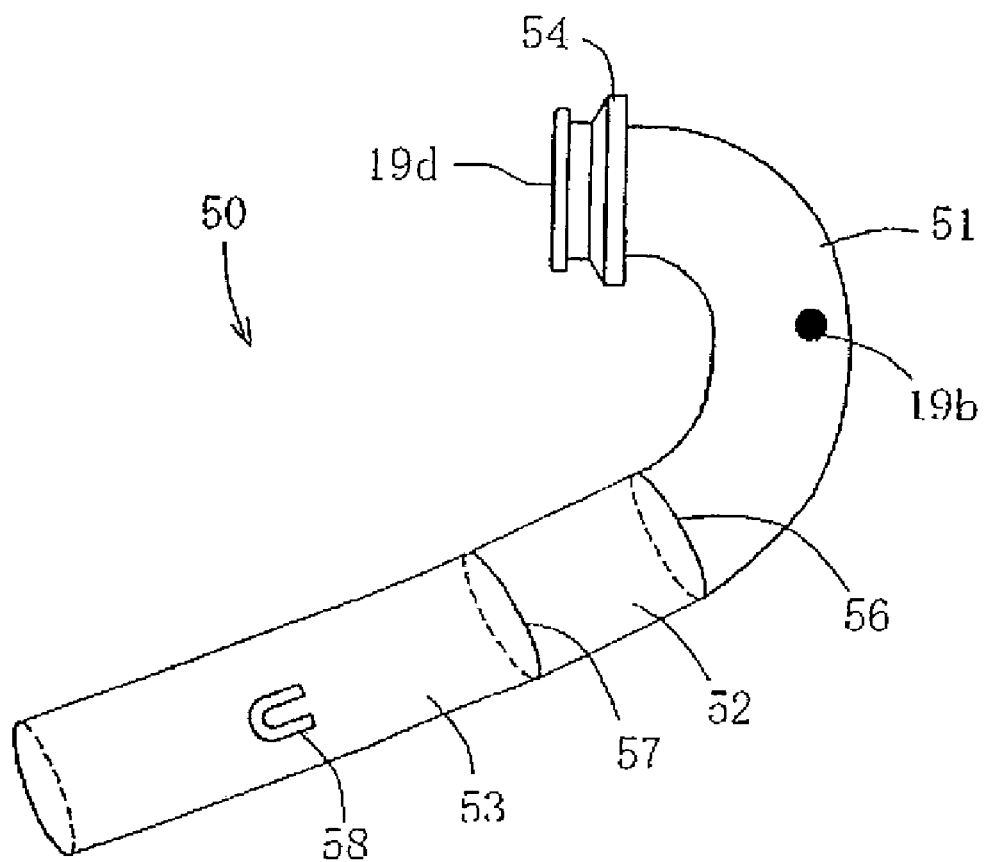
FIG. 17 is a plan showing the upper part.

The details of each component of the exhaust pipe 19 will be described below. The exhaust pipe 19 is assembled by connecting metal pipes divided in plural. FIG. 16 is a side view showing the upper part 50 and FIG. 17 is a plan showing the upper part. The upper part 50 is configured by three parts of a first pipe 51, a second pipe 52 and a third pipe 53 in order from the exhaust upstream side, each part is connected and is integrated by welding.

As for the first pipe 51, a mounting flange 54 is provided in the vicinity of a connecting end 19d to the exhaust port 18. The first pipe 51 is convexly curved to the rear in a substantial semicircle as shown in FIG. 16 and an end on the exhaust downstream side of the first pipe 51 is bent back up to a position in which the end is overlapped with the vicinity of the mounting flange 54 in a side view as shown in FIG. 17. The end on the exhaust downstream side of the first pipe 51 is extended outward and diagonally downward (see FIG. 17).

The second pipe 52 is a relatively short pipe, both ends on the exhaust upstream side and on the exhaust downstream side are overlapped with the end on the exhaust downstream side of the first pipe 51 and an end on the exhaust upstream side of the third pipe 53, and the ends are integrated by welding. A welding line 56, 57 is provided. The second pipe 52 extends in a direction in which the end on the exhaust downstream side of the first pipe 51 is extended.

The end on the exhaust upstream side of the third pipe 53 is equivalent to the bent part 19e, the exhaust upstream side is bent inside and diagonally upward from the bent part (see FIG. 16). The upstream side is connected and welded to the end on the exhaust downstream side of the second pipe 52. The exhaust downstream side from the bent part 19e of the third pipe 53 extends diagonally downward, forward (see FIG. 16) and slightly outward substantially straight (see FIG. 17).

As described above, the upper part 50 is relatively often bent in the shape of a pipe that can be configured by dividing the upper part into the first pipe 51, the second pipe 52 and the third pipe 53 in three. A hook 58 is provided for a spring for pulling a joint provided to the side of the third pipe 53 by the spring.

Figure 18:
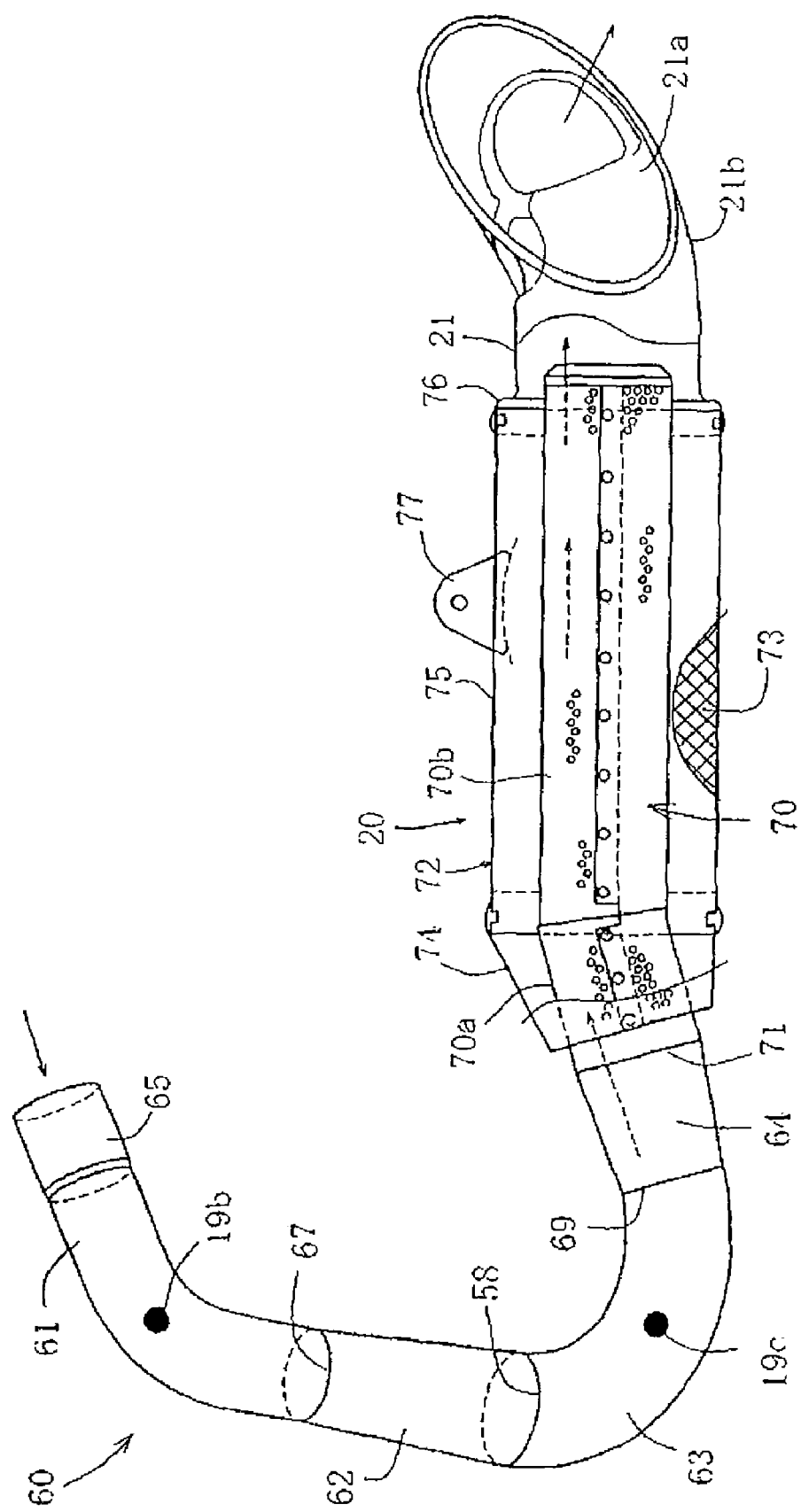
FIG. 18 is a side view showing a lower part of the exhaust pipe and the following part.
Figure 19:
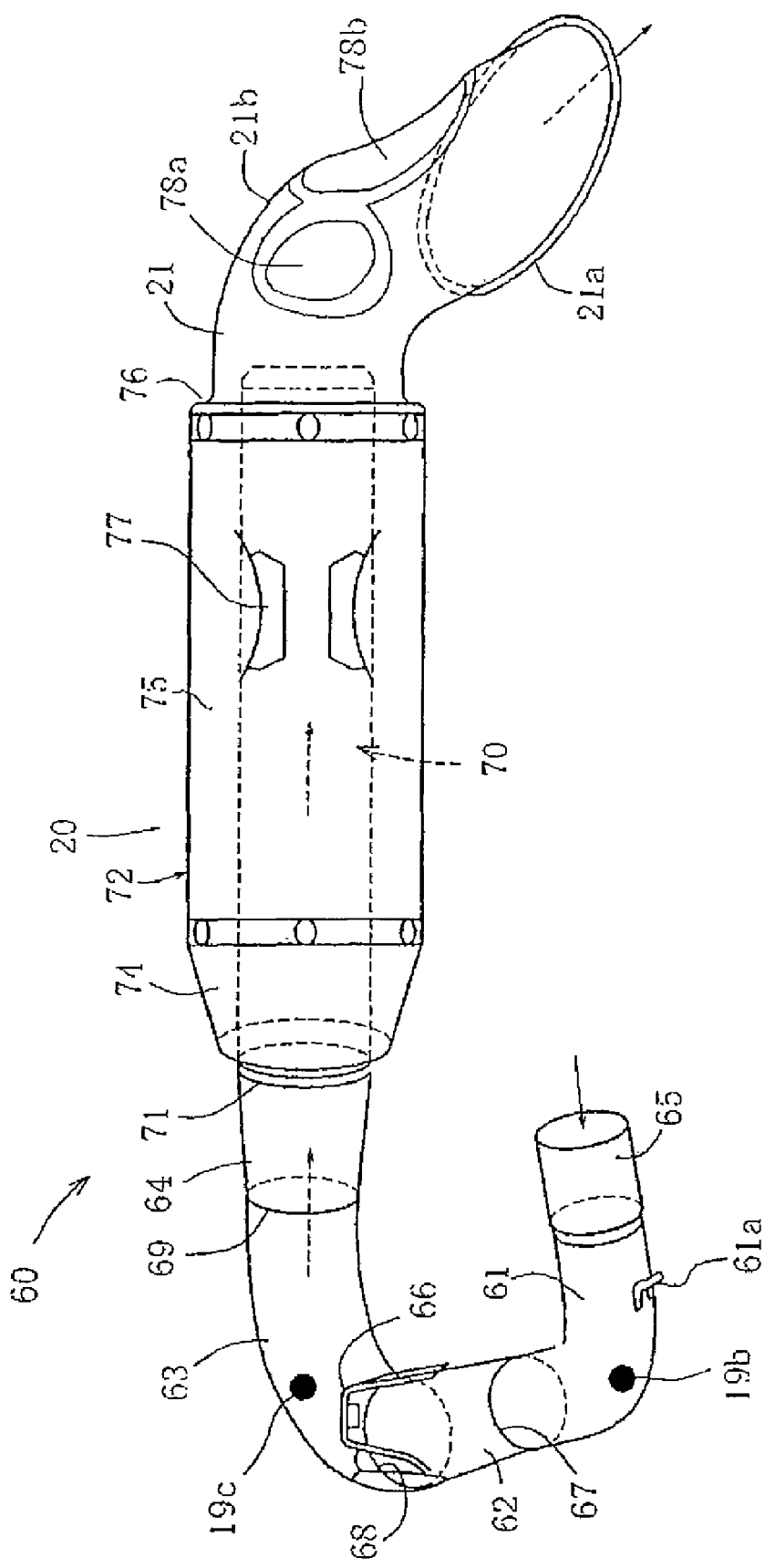
FIG. 19 is a plan showing the lower part and the following part.

FIG. 18 is a side view showing the lower part 60, the muffler 20 and the tail pipe 21 and FIG. 19 is a plan view thereof. The lower part 60 is divided into a first pipe 61, a second pipe 62, a third pipe 63 and a fourth pipe 64 in order from the exhaust upstream side and each part is connected and integrated by welding.

The first pipe 61 is bent in the second bent part 19b substantially like a dogleg in a side view (see FIG. 19) and an end 65 on the exhaust upstream side is inserted and connected to the end on the exhaust downstream side of the third pipe 63 in the second bent part 19b in a top view. A hook 61a is provided for fitting a tension spring (see FIG. 19). A bracket 66 is provided in the vicinity of the second bent part 19b and is coupled to the stay 9c projecting from the crankcase, and the exhaust pipe is supported by the stay (see FIG. 2).

The second pipe 62 is formed as a tapered pipe a diameter of which is gradually widened toward the exhaust downstream side, is vertically arranged in a side view, is diagonally arranged so that the exhaust downstream side is located inside in the vehicle body in a top view, and an end on the exhaust upstream side and an end on the exhaust downstream side are welded to the end on the exhaust downstream side of the first pipe 61 and an end on the exhaust upstream side of the third pipe 63. A welding line 67, 68 is provided.

The third pipe 63 is curved to the rear from the upside in the third bent part 19c in a side view and is curved to the rear from a condition in which the third pipe is laterally extended inside from the outside in a top view.

The fourth pipe 64 is welded to the end on the exhaust downstream side of the third pipe 63 at an end on the exhaust upstream side. A welding line 69 is provided.

The exhaust downstream side of the fourth pipe 64 is a tapered pipe gradually widened and welded to an end on the exhaust upstream side of an inner pipe 70 configuring the muffler 20. A welding line 71 is provided. As described above, an intricate shape including the second bent part 19b and the third bent part 19c can be easily realized by dividing the lower part 60 into the first pipe 61 to the fourth pipe 64.

The muffler 20 includes a double pipe structure provided with the inner pipe 70 and an outer pipe 72. The inner pipe 70 is provided with the diagonal front 70a which is an extended part of the fourth pipe 64 and a straight part 70b bent from the front 70a and horizontally extended and is formed by rolling a punched plate and further winding a metal mesh outside the rolled plate. Well-known noise absorbing material 73 such as glasswool is filled between the inner pipe 70 and the outer pipe 72.

The outer pipe 72 is provided with a front cone 74 covering the front 70a of the inner pipe 70 and having a tapered peripheral wall, a center part 75 covering the straight part 70b in parallel and a rear 76 a rear end of which is closed and which functions as a spacer for coaxially supporting an end on the exhaust downstream side of the straight part 70b of the inner pipe 70 in the center part 75. As is clear from FIG. 2, the front cone 74 is in the shape of a substantial truncated cone having an inclined face narrowed forward, the inclined face is substantially parallel to the inclined bottom 9d provided to the bottom of the crankcase 9. Thus, the muffler 20 can be also located close to the engine (the bottom of the crankcase), and the front cone can contribute to the concentration of mass. The inclined bottom 9d is the bottom of a part connecting the oil pan 9a and the transmission 9b and is inclined upward toward the rear.

The connection of the front cone 74 and the center part 75 and the connection of the center part 75 and the rear 76 are performed by overlapping and riveting the respectives parts thereof. An end on the exhaust upstream side of the tail pipe 21 surrounds the end on the exhaust downstream side of the straight part 70b of the inner pipe 70 and is welded to the rear 76. A stay 77 is provided for supporting the muffler 20 by the body frame.

The exhaust downstream side of the tail pipe 21 is bent outward in an intermediate bent part 21b in a top view and is open sideways. An opening 21a is elliptic and is inclined diagonally upward and backward. Concave portions 78a, 78b are formed on an outer surface in the vicinity of the bent part 21b.

Figure 20:
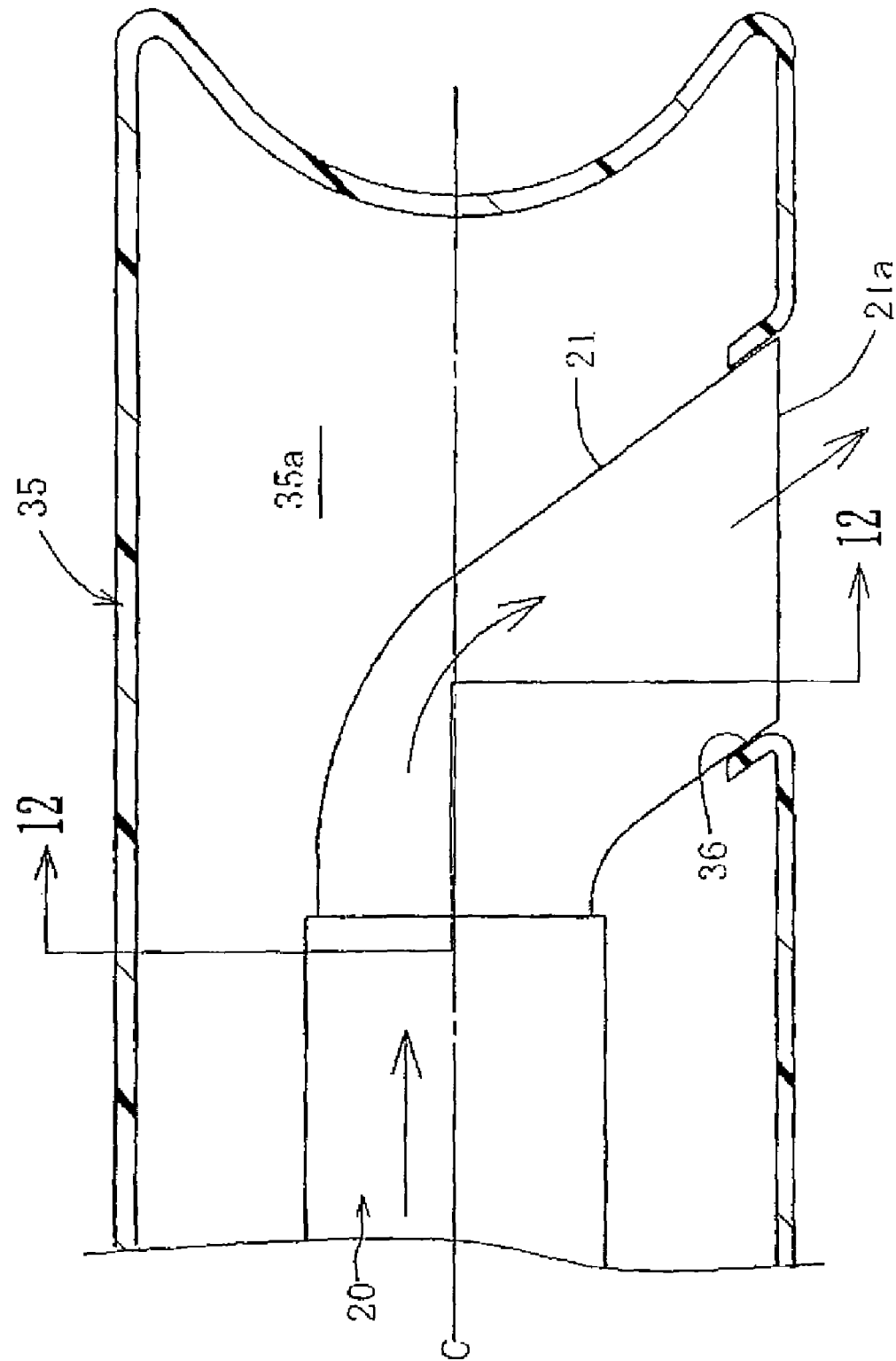
FIG. 20 is a plan showing the arrangement of a tail pipe.

FIG. 20 is a plan showing the piping of the tail pipe 21, the muffler 20 and the tail pipe 21 are housed in space 35a in the shape of a tunnel of the lower cover 34, and the exhaust vent 21a of the tail pipe 21 is placed in a side opening 36 formed on the one side of the overhanged part 35 at the rear end of the lower cover 34. As a result, exhaust gas can be emitted outward from the overhanged part 35 of the lower cover 34. That is, the overhanged part 35 forms an exhaust duct together with the tail pipe 21 and exhaust gas is emitted outward through the side opening 36 and the exhaust vent 21a.

Figure 21:
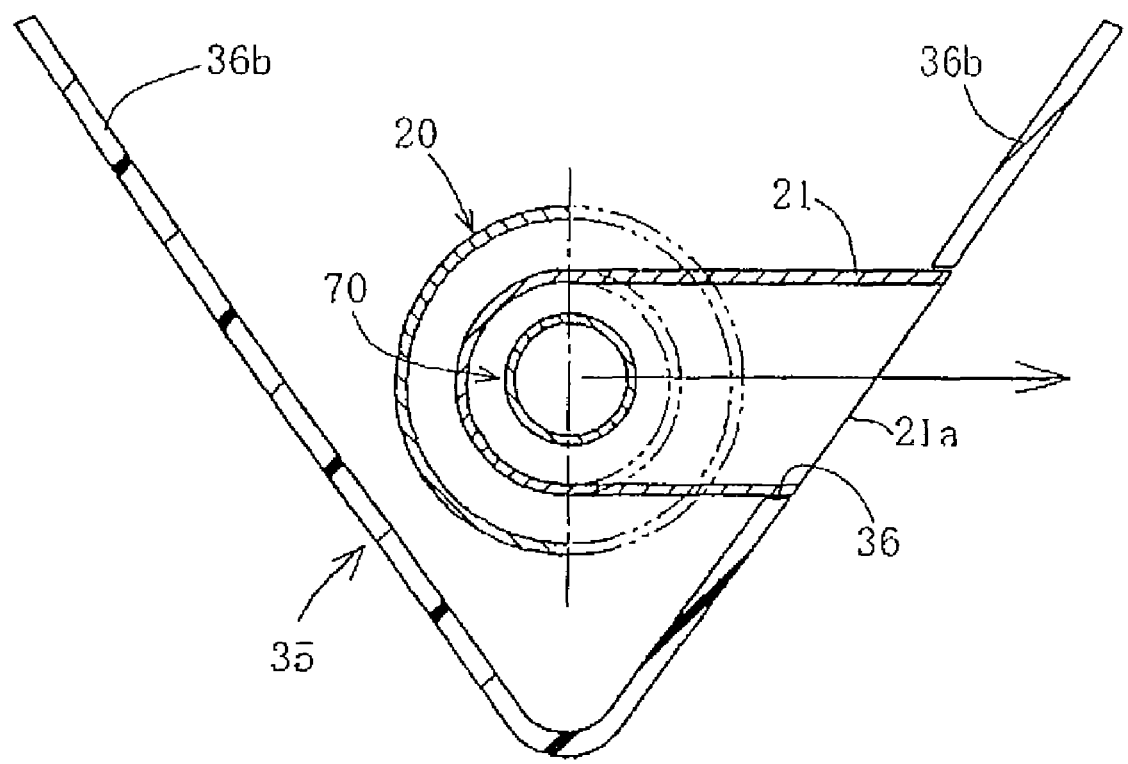
FIG. 21 is a sectional view viewed along a line 12-12 in FIG. 20.

FIG. 21 is a sectional view viewed along a line 12-12 in FIG. 20, the overhang part 35 has a substantial V-type section open upward, the exhaust vent 21a of the tail pipe 21 is inclined with the lower side regressing inside the vehicle body, in other words, with the upper side overhanging outward, and exhaust gas is emitted diagonally downward and outward to block an upward flow.

Figure 22:
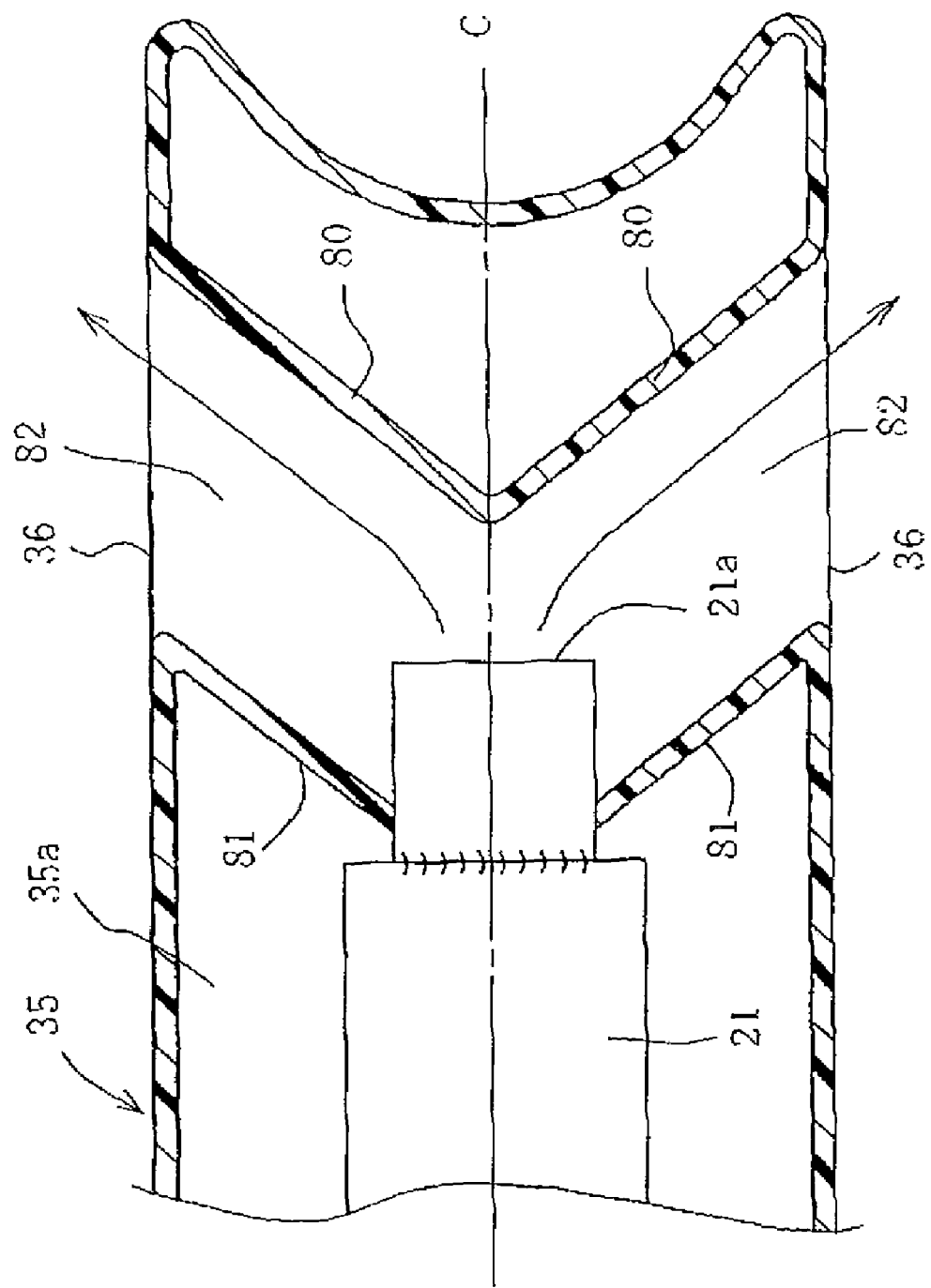
FIG. 22 shows a variation of FIG. 20.

FIG. 22 shows a variation of the side opening. A rear end of the tail pipe 21 extends straight on the center of the vehicle body, and is provided with the open exhaust vent 21a. A guide wall 80 convex forward in a substantial V type is formed at the back of the exhaust vent 21a and each side opening 36 is formed in each of right and left side walls of the overhang part 35. The space 35a in the overhang part 35 is closed by a partition wall 81 having an inclination parallel to the guide wall 80 around the tail pipe 21. Exhaust passages 82 are laterally branched toward the right and left side openings 36 from the exhaust vent 21a.

As a result, exhaust gas emitted along the center C of the vehicle body from the exhaust vent 21a is laterally separated by the guide wall 80 and passes the exhaust passages 82 in the right and left directions. The exhaust gas is emitted to the rear on the center of the vehicle body and is promptly emitted outside from the right and left side openings 36. In addition, as the tail pipe 21 is not bent, a flow of exhaust gas is smooth and exhaust efficiency can be enhanced. The exhaust passages 82 formed in the overhang part 35 functions as an exhaust duct and exhaust gas is laterally emitted outward through the right and left side openings 36.

Next, the action of this embodiment will be described. As shown in FIGS. 2 and 5, as the cylinder 10 is inclined to the, the exhaust pipe 19 extends at the back of the cylinder 10 and is bent back and crosses the left side of the cylinder 10 diagonally forward and downward. Afterward the exhaust pipe is bent downward in front of the cylinder 10 and further the exhaust pipe is bent around the oil pan 9a protruding downward in the front of the crankcase 9 and is connected to the muffler 20 arranged below the transmission 9b of the crankcase 9. Thus, the mass can be concentrated by arranging the exhaust pipe 19 around the backward inclined cylinder 10 and the center of gravity can be lowered by arranging the muffler 20 below the crankcase. In addition, a fear of an sufficient exhaust pipe length by arranging the muffler 20 below the transmission 9b of the crankcase 9 is swept away by the backward inclination of the cylinder 10 and the arrangement of the exhaust pipe 19 around the cylinder, the necessary and sufficient length can be secured, and the output of the engine can be enhanced.

As shown in FIG. 3 and FIGS. 7 to 10, as the exhaust pipe extends from the exhaust port 18 toward the back of the cylinder 10 and afterward, is divided into the upper part 50 on the exhaust upstream side and the lower part 60 on the exhaust downstream side in the part turned down beside the cylinder though often a bent structure is adopted for the exhaust pipe 19. The upper part 50 and the lower part 60 can be separately manufactured by dividing a part difficult to bend into the upper and lower parts and therefore manufacture is facilitated. Further, as the exhaust pipe can be assembled by only connecting the upper part 50 and the lower part 60 along the parting line 19f, the assembly is also facilitated and the ease of assembly is enhanced.

Further, as shown in FIG. 2, as the oil pan 9a is provided in a lower part of the crankcase 9 of the engine 8 and is protruded downward, compared with the transmission 9b which is the lower part of the crankcase on the rear side of the oil pan, the space for arranging the muffler 20 is secured below the transmission 9b between the back of the oil pan 9a and the rear wheel 31 and the muffler 20 can be arranged in the space. Therefore, the center of gravity can be lowered by arranging the muffler 20 in the lowest position of the engine 8 and as the muffler 20 can be arranged close to the substantial center of the crankcase 9 in which the center of gravity of the engine 8 is located, mass can be concentrated.

In addition, as shown in FIG. 3 and FIGS. 20 to 22, even if the muffler 20 is arranged in front of the rear wheel 31, exhaust gas can be emitted outside the vehicle body away the rear wheel 31 from the side opening 36 provided to the side of the overhang part through the tail pipe 21 equivalent to an exhaust duct and the exhaust passage in the overhang part 35.

At this time, the side opening 36 can be provided on the right or left side or on both right and left sides of the overhang part 35 and when the side opening is provided on one side, an exhaust duct can be easily formed by only bending the tail pipe 21 sideways. When the side opening is provided on both sides, the exhaust passage branched sideways is formed in the overhang part 35 to function as an exhaust duct.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle wherein an engine is arranged between front and rear wheels and an intake part and an exhaust part are connected to a front and a rear of a cylinder, comprising:
    a radiator arranged in front of the cylinder with the cylinder being inclined to the rear;
    an intake port provided in front of the cylinder; and
    an exhaust port provided in back of the cylinder;
    said intake part being arranged in front of the cylinder and at the back of the radiator,
    wherein the intake part is an intake box for taking air from the front side of a vehicle in and supplying the air to the engine from the intake port; and
    an air filter is arranged in the intake box, the air filter being formed in a substantial V type toward the front in a top view, and
    wherein the intake part includes a body and an intake duct and further includes a flange forming an edge of an opening at an upper part of the body with a seal operatively mounted on said flange and the opening.

2. The motorcycle according to claim 1, comprising:
    a duct provided on the upside of the radiator and connected to the intake box;
    wherein a stay for supporting the radiator by a vehicle body pierces the duct.

3. The motorcycle according to claim 1, wherein the radiator and the cylinder form in a substantial V type in a side view; and the intake part is arranged in substantial V-type space.

4. The motorcycle according to claim 1, and further including a window hole formed in a front wall, said window hole being covered with the intake duct via air filter.

5. The motorcycle according to claim 1, where the engine, provided with a cylinder and a crankcase, is arranged between front and rear wheels, wherein the cylinder is inclined towards a rear portion of the motorcycle, comprising:
    an exhaust port is provided in back of the cylinder;
    an exhaust pipe connected to the exhaust port and extending in front of the cylinder from the back of the cylinder along the side and extended backward under the crankcase from the front side of the cylinder; and
    a muffler connected to the exhaust pipe under the crankcase.

6. The motorcycle according to claim 5, wherein the exhaust pipe extends from the exhaust port toward the back of the cylinder and afterward is divided into the exhaust upstream side and the exhaust downstream side in a part turned down beside the cylinder.

7. The motorcycle according to claim 6, comprising:
    an oil pan provided in a lower part of the crankcase of the engine,
    wherein the oil pan projects more downwardly than a lower part of the crankcase on the rear side of the oil pan; and
    the muffler is arranged between the back of the oil pan and the rear wheel.

8. The motorcycle according to claim 6, and further including an exhaust duct extending sideways in a vehicle body from the center of the rear of the muffler.

9. The motorcycle according to claim 5, comprising:
    an oil pan provided in a lower part of the crankcase of the engine,
    wherein the oil pan projects more downwardly than a lower part of the crankcase on the rear side of the oil pan; and
    the muffler is arranged between the back of the oil pan and the rear wheel.

10. The motorcycle according to claim 9, and further including an exhaust duct extending sideways in a vehicle body from the center of the rear of the muffler.

11. The motorcycle according to claim 5, and further including an exhaust duct extending sideways in a vehicle body from the center of the rear of the muffler.

12. The motorcycle according to claim 11, wherein: the exhaust duct is provided utilizing a body cover; and
    exhaust gas is emitted sideways from a side opening formed on the body cover.

13. An intake part and an exhaust part for use with an engine comprising:
    a cylinder having a front and a rear portion;
    a radiator arranged in front of the cylinder with the cylinder being inclined to the rear;
    an intake port provided in front of the cylinder; and
    an exhaust port provided in back of the cylinder;
    said intake part being arranged in front of the cylinder and at the back of the radiator,
    wherein the intake part is an intake box for taking air from the front side of a vehicle in and supplying the air to the engine from the intake port; and
    an air filter is arranged in the intake box, the air filter being formed in a substantial V type toward the front in a top view, and
    wherein the intake part includes a body and an intake duct and further includes a flange forming an edge of an opening at an upper part of the body with a seal operatively mounted on said flange and the opening.

14. The intake part and an exhaust part for use with an engine according to claim 13, comprising:
- a duct provided on the upside of the radiator and connected to the intake box;
- wherein a stay for supporting the radiator by a vehicle body pierces the duct.

15. The intake part and an exhaust part for use with an engine according to claim 13, wherein the radiator and the cylinder form in a substantial V type in a side view; and
the intake part is arranged in substantial V-type space.

16. The intake part and an exhaust part for use with an engine according to claim 13, and further including a window hole formed in a front wall, said window hole being covered with the intake duct via air filter.

* * * * *